United States Patent
Kuthirummal et al.

(10) Patent No.: US 7,420,750 B2
(45) Date of Patent: Sep. 2, 2008

(54) CATADIOPTRIC SINGLE CAMERA SYSTEMS HAVING RADIAL EPIPOLAR GEOMETRY AND METHODS AND MEANS THEREOF

(75) Inventors: Sujit Kuthirummal, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/135,830

(22) Filed: May 23, 2005

(65) Prior Publication Data
US 2006/0050386 A1 Mar. 9, 2006

Related U.S. Application Data

(60) Provisional application No. 60/573,778, filed on May 21, 2004.

(51) Int. Cl.
G02B 17/00 (2006.01)
H04N 13/02 (2006.01)
H04N 15/00 (2006.01)

(52) U.S. Cl. .......................... 359/726; 348/46
(58) Field of Classification Search ................. 359/726, 359/727, 730, 853, 867; 396/324, 331, 333; 348/22.1, 239, 42, 46, 49
See application file for complete search history.

(56) References Cited

U.S. PATENT DOCUMENTS

| 6,108,130 | A | 8/2000 | Raj |
| 6,208,813 | B1 | 3/2001 | Carlsson et al. |
| 6,313,865 | B1 | 11/2001 | Driscoll, Jr. et al. |
| 6,870,563 | B1 * | 3/2005 | Kang .................. 348/222.1 |
| 2003/0156187 | A1 * | 8/2003 | Gluckman et al. .......... 348/46 |

OTHER PUBLICATIONS

D. Southwell, A. Basu, M. Fiala, and J. Reyda, "Panoramic Stereo," *International Conference on Pattern Recognition*, pp. 378-382, Aug. 1996.

J. Gluckman, S.K. Nayar, and K. Thoresz, "Real Time Omnidirectional and Panoramic Stereo," *DARPA Image Understanding Workshop (IUW)*, pp. 299-303, No. 1998.

(Continued)

*Primary Examiner*—Alicia M Harrington
(74) *Attorney, Agent, or Firm*—Byrne Poh LLP

(57) ABSTRACT

Catadioptric single camera systems capable of sampling the lightfield of a scene from a locus of circular viewpoints and the methods thereof are described. The epipolar lines of the system are radial, and the systems have foveated vision characteristics. A first embodiment of the invention is directed to a camera capable of looking at a scene through a cylinder with a mirrored inside surface. A second embodiment uses a truncated cone with a mirrored inside surface. A third embodiment uses a first truncated cone with a mirrored outside surface and a second truncated cone with a mirrored inside surface. A fourth embodiment of the invention uses a planar mirror with a truncated cone with a mirrored inside surface. The present invention allows high quality depth information to be gathered by capturing stereo images having radial epipolar lines in a simple and efficient method.

26 Claims, 29 Drawing Sheets

OTHER PUBLICATIONS

S. Nene and S.K. Nayar, "Stereo With Mirrors," *International Conference on Computer Vision*, pp. 1087-1094, Jan. 1998.

Y. Boykov, O. Veksler, and R. Zabih, "Markov Random Fields With Efficient Approximations," *Computer Vision and Pattern Recognition Conference*, pp. 648-655, Jun. 1998.

S.K. Nayar and V. Peri, "Folded Catadioptric Cameras," *IEEE Conference on Computer Vision and Pattern Recognition*, pp. 217-223, Jun. 1999.

H.-Y. Shum and L.-W. He, "Rendering With Concentric Mosaics," *Siggraph*, Aug. 1999.

J. Gluckman and S.K. Nayar, "Planar Catadioptric Stereo, Geometry and Calibration," *IEEE Conference on Computer Vision and Pattern Recognition*, pp. 22-28, Jun. 1999.

S. Baker and S. Nayar, "A theory of Single-Viewpoint Catadioptric Image Formation," *International Journal of Computer Vision*, 35, pp. 175-196, Nov. 1999.

C. Geyer and Kostas Daniilidis, "Structure and Motion From Uncalibrated Catadioptric Views," *IEEE Conference on Computer Vision and Pattern Recognition*, pp. 279-286, Dec. 2001.

D. Scharstein and R. Szeliski, "A Taxonomy and Evaluation of Dense Two-Frame Stereo," *Technical Report*, MSR-TR-2001-81, Nov. 2001.

V. Kolmogorov, R. Zabih, "Computing Visual Correspondence With Occlusions Using Graph Cuts," *International Conference on Computer Vision*, pp. 508-515, Jul. 2001.

S.M. Seitz and J.Kim, "The Space of All Stereo Images," *International Journal of Computer Vision*, 48:21-38, Jun. 2002.

V. Kolmogorov, R. Zabih, and S. Gortler, "Multi-Camera Scene Reconstruction Via Graph Cuts," *European Conference on Computer Vision*, pp. 82-96, May 2002.

S.-S. Lin and R. Bajcsy, "High Resolution Catadioptric Omni-Directional Stereo Sensor for Robot Vision," *International Conference on Robotics and Automation*, pp. 1694-1699, Sep. 2003.

A. Bernardino and J. Santos-Victor, "A Binocular Stereo Algorithm for Log-polar Foveated Systems," International Workshop on Biologically Motivated Computer Vision, 2002, pp. 127-136.

International Preliminary Report on Patentability, International Patent Application No. PCT/US05/018138, Nov. 30, 2006.

* cited by examiner

CATADIOPTRIC SINGLE CAMERA SYSTEMS HAVING RADIAL EPIPOLAR GEOMETRY AND METHODS AND MEANS THEREOF

CROSS-REFERENCE TO RELATED APPLICATIONS

The present application claims the benefit of provisional application 60/573,778, filed on May 21, 2004, the content of which is hereby incorporated by reference herein in its entirety.

STATEMENT REGARDING FEDERALLY SPONSORED RESEARCH OR DEVELOPMENT

The present invention was made with United States government support under Grant No. NSF ITR-00-85864 awarded by the National Science Foundation. The United States government may have certain rights in this invention.

BACKGROUND

The present invention relates to methods and systems for imaging. More particularly, the present invention relates to methods and systems capable of capturing depth information in an image.

Since the advent of photography, significant advances have been made to improve the information that can be gathered from a picture. For example, certain photographic techniques enable three-dimensional (3D) information to be obtained by taking a number of different two-dimensional (2D) images at various viewpoints, which are then combined with certain algorithms to generate a 3D reconstruction of the scene. Effectively, in such cases, the lightfield of a scene is being sampled at different viewpoints and being combined to recover the 3D information. Many different methods of sampling lightfields are known (see for example S. M. Seitz and J. Kim, "The space of all stereo images," *International Journal of Computer Vision*, 48:21-38, 2002; H.-Y. Shum and L.-W. He, "Rendering with concentric mosaics, *Siggraph*, 1999, which is hereby incorporated by reference herein in its entirety).

For example, one aspect of sampling the lightfield of a scene may include obtaining depth information, which can be carried out utilizing stereographic imaging techniques. In conventional techniques for stereographic imaging, two pictures are taken at the same time, one slightly to the side of the other—as though one camera was one eye and the other camera was another eye. These pictures are then displayed side by side and a 3D depth effect can be produced if the left eye looks only at the left image, and the right eye only looks at the right image.

Many stereographic imaging systems are designed, however, so that the geometrical properties of the optical systems are fixed before the lightfield of a scene is sampled. For example, the two-camera system described above utilizes a popular design wherein the epipolar lines are all parallel to each other and coincident with the horizontal scan lines of images.

Epipolar lines are lines that form on an image plane when epipolar planes intersect the image plane, wherein epipolar planes are defined as a plane containing the optical centers of the two cameras and any given point in the scene of interest.

Systems having such horizontal epipolar lines suffer from a serious problem. Horizontal edges are common in most real world scenes and their projections coincide with the epipolar lines. Thus, disparities along these edges cannot be computed, and stereo algorithms using these images are not able to compute depth at such points in space.

To alleviate such problems, panoramic stereo systems have incorporated an alternative geometry, wherein the epipolar lines are radial in the image (see for example J. Gluckman, S.K. Nayar, and K.J. Thoresz, "Real time omnidirectional and panoramic stereo," *DARPA Image Understanding Workshop*, pages 299-303. November 1998; S.-S. Lin and R. Bajcsy, "High resolution catadioptric omni-directional stereo sensor for robot vision," *International Conference on Robotics and Automation*, pages 1694-1699, 2003, which are hereby incorporated by reference herein in their entireties). Such geometry is not as likely to suffer from the afore-mentioned problem, as most objects do not possess purely radial edges. However, such panoramic stereo multi-camera systems are typically focused on outward looking views and have low spatial resolution.

In response to a demand for capturing larger amounts of information from images, catadioptric systems have been developed (see for example, J. Gluckman, S.K. Nayar, and K.J. Thoresz, "Real time omnidirectional and panoramic stereo,"*DARPA Image Understanding Workshop*, Pages 299-303, November 1998; C. Geyer and Kostas Daniilidis, "Structure and motion from uncalibrated catadioptric views," *IEEE Conference on Computer Vision and Pattern Recognition*, pages 279-286, 2001; S.-S. Lin and R. Bajcsy, "High resolution catadioptric omni-directional stereo sensor for robot vision", *International Conference on Robotics and Automation*, pages 1694-1699, 2003, which are hereby incorporated by reference herein in their entireties). Catadioptric systems are optical systems containing a combination of refracting and reflecting elements, such as lenses and mirrors, and have successfully been employed to increase the field of views of each camera used.

Nevertheless, multi-camera stereo systems, whether with or without mirrors, require geometric and photometric calibration, making their use time consuming, tedious, and prone to errors. These problems can be further exacerbated when dealing with dynamic scenes, as synchronization between the multiple cameras may be necessary.

To alleviate such problems, a number of techniques have been proposed to perform stereographic imaging using a catadioptric single camera system, wherein one or more mirrors are used to simulate virtual viewpoints (see for example S. Nene and S.K. Nayar, "Stereo with mirrors," *International Conference on Computer Vision*, 1998; D. Southwell, A. Basu, M. Fiala, and J. Reyda, "Panoramic stereo," *International Conference on Pattern Recognition*, pages 378-382, 1996; J. Gluckman and S.K. Nayar, "Planar catadioptric stereo: Geometry and calibration," *IEEE Conference on Computer Vision and Pattern Recognition*, 1999, which are hereby incorporated by reference herein in their entireties). Advantages of such catadioptric single camera systems include requiring little or no calibration, being mobile, being easy to use, and having no need for synchronization when taking pictures of dynamic scenes. However, catadioptric single camera systems having radial epipolar geometry and the attendant advantages thereof have not yet been realized.

SUMMARY OF THE INVENTION

In accordance with the present invention, catadioptric single camera systems having radial epipolar lines for obtaining stereographic images and methods thereof are described. Systems in accordance with certain embodiments of the present invention generally have a sensor comprising one or more mirrors. The radial epipolar lines allow more robust matching of corresponding projections and thus enable recovery of high quality depth maps of a scene of interest. Systems in accordance with certain embodiments of the present invention may also possess foveated vision characteristics, wherein regions in the center of the field of view of the camera have a higher depth and spatial resolution.

Certain embodiments of the present invention are directed to a catadioptric single camera system comprising a camera and one or more mirrors, wherein the camera and the one or more mirrors have a radial epipolar geometry in accordance with the present invention.

Furthermore, certain embodiments of the present invention are directed to a lens assembly comprising one or more lenses and one or more mirrors that include at least a part of an inside surface of a cylinder, wherein the one or more lenses and the one or more mirrors have a radial epipolar geometry in accordance with the present invention.

Furthermore, certain embodiments of the present invention are directed to a lens assembly comprising one or more lenses and one or more mirrors that include at least a part of an inside surface of a truncated cone, wherein the one or more lenses and the one or more mirrors have a radial epipolar geometry in accordance with the present invention.

Furthermore, certain embodiments of the present invention are directed to a lens assembly comprising one or more lenses and one or more mirrors that include at least a part of an inside surface of a first truncated cone and at least a part of an outside surface of a second truncated cone, wherein the one or more lenses and the one or more mirrors have a radial epipolar geometry in accordance with the present invention.

Furthermore, certain embodiments of the present invention are directed to a lens assembly comprising one or more lenses and one or more mirrors that include at least a part of a planar surface and at least a part of an inside surface of a truncated cone, wherein the one or more lenses and the one or more mirrors have a radial epipolar geometry in accordance with the present invention.

Additionally, certain embodiments of the present invention are directed to a method obtaining depth information from an image, comprising sampling a lightfield of a scene with a catadioptric single camera system having a radial epipolar geometry to obtain the image and processing the captured image to obtain depth information in accordance with the present invention.

Additional embodiments of the present invention are directed to a computer readable medium comprising instructions being executed by a computer, the instructions including a software application for obtaining depth information from an image, the instructions for implementing the steps of sampling a lightfield of a scene with a catadioptric single camera system having a radial epipolar geometry to obtain the image, and processing the image to obtain depth information.

BRIEF DESCRIPTION OF THE DRAWINGS

The above and other objects and advantages of the present invention will be apparent upon consideration of the following detailed description, taken in conjunction with the accompanying drawing, in which like reference characters refer to like parts throughout, and in which.

DETAILED DESCRIPTION OF THE INVENTION

The present invention will now be described more fully hereinafter, in which different embodiments of the invention are shown. This invention may, however, be embodied in many different forms and should not be construed as being limited to the embodiments explicitly set forth herein; rather, these embodiments are provided so that this disclosure will be thorough and complete, and will fully convey the scope of the invention to those of ordinary skill in the art. It will be understood that when an element, such as a mirror or a cylinder, is referred to as being "on" another element, it may be directly on the other element or one or more intervening elements may also be present.

Figure 1:
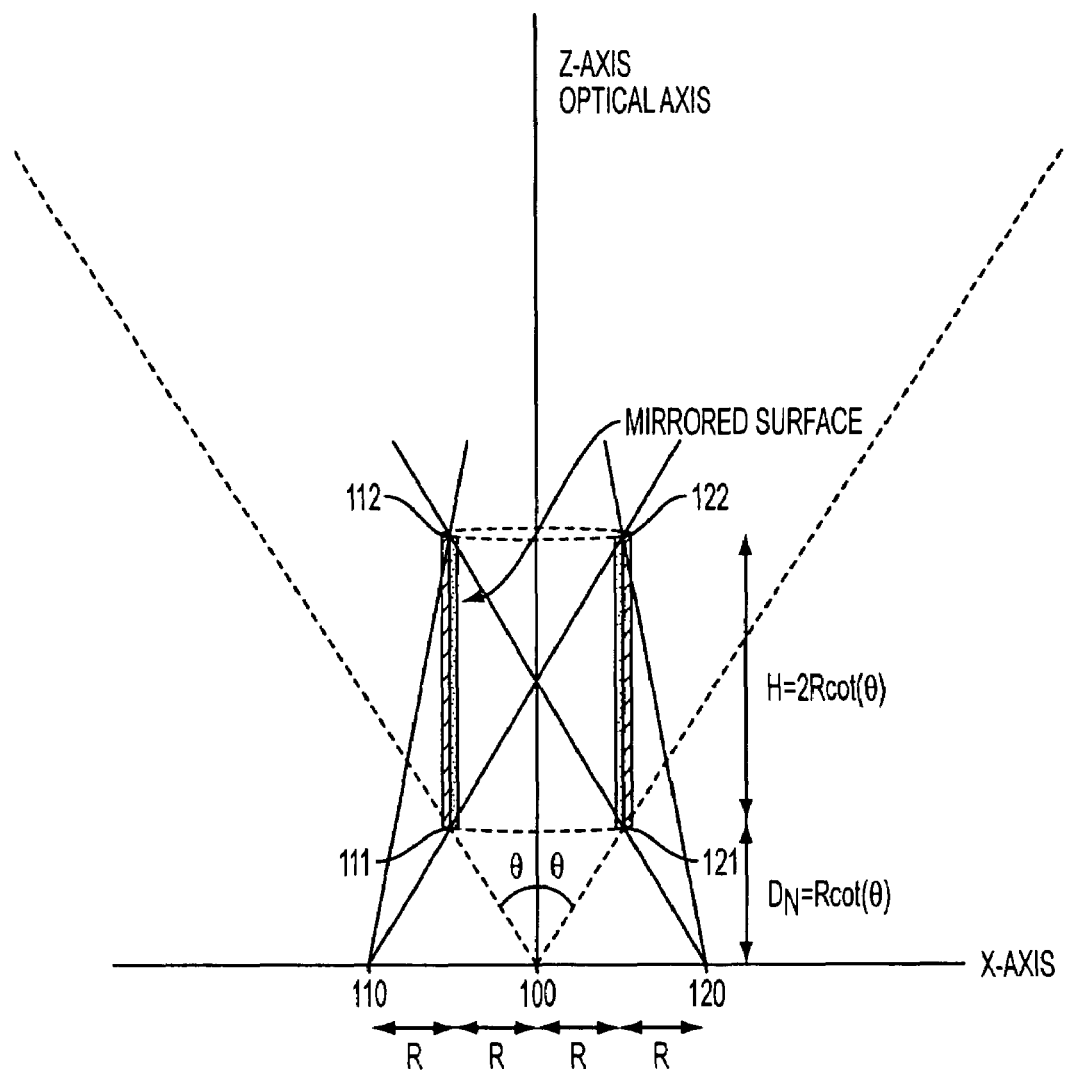
FIG. 1 is a diagram of a catadioptric single camera system having a cylinder with a mirrored inside surface in accordance with certain embodiments of the present invention.

FIG. 1 shows a diagram of a catadioptric single camera system having a cylinder with a mirrored inside surface in accordance with certain embodiments of the present invention. As illustrated, a camera may be placed so that the entrance pupil of the camera is at a central viewpoint 100 with the optical axis pointing along the z-axis. The actual field of view of the camera may be represented as an angle spanned by $2\theta$, as shown in FIG. 1. The cylinder may be placed so that it is concentric with the z-axis and the optical axis of the camera. The cylinder is illustrated in FIG. 1 by a line between endpoints 111 and 112 and a line between endpoints 121 and 122, wherein endpoints 111 and 121 represent the ends of the cylinder near central viewpoint 100, and endpoints 112 and 122 represent the end of the cylinder away from central viewpoint 100. The radius of the cylinder may be represented as R.

Virtual viewpoints 110 and 120 may be obtained by 1) extending the mirror surface towards the x-axis, 2) forming a perpendicular line from central viewpoint 100 to the extended mirror surface, 3) measuring the distance, D, from central viewpoint 100 to the intersection point of the perpendicular line and the extended mirror surface, and 4) placing a virtual viewpoint at a point along the perpendicular line at a distance of D from the extended mirror surface.

To take advantage of the full field of view of the camera, the distance of the camera from the cylinder may be such that the ends of the field of view graze endpoints 111 and 121. In such case, the cylinder is placed at a distance of $$D_N = R \cot(\theta) \qquad (1)$$

from the entrance pupil of the camera. It should be noted that other distances may also be used. Furthermore, to maximize the effective fields of view of the virtual viewpoints while minimizing inter-reflection effects in the captured images, the field of view of virtual viewpoint 110 may graze endpoints 111 and 122 and the field of view of virtual viewpoint 120 may graze endpoints 121 and 112. Therefore, as shown in FIG. 1, virtual viewpoint 110, endpoint 111, and endpoint 122 may be collinear and virtual viewpoint 120, endpoint 121, and endpoint 112 may be collinear. Accordingly, in such case and when equation [1] is satisfied, the height of the cylinder may be represented by $$H = 2R \cot(\theta) \qquad (2)$$

Figure 2:
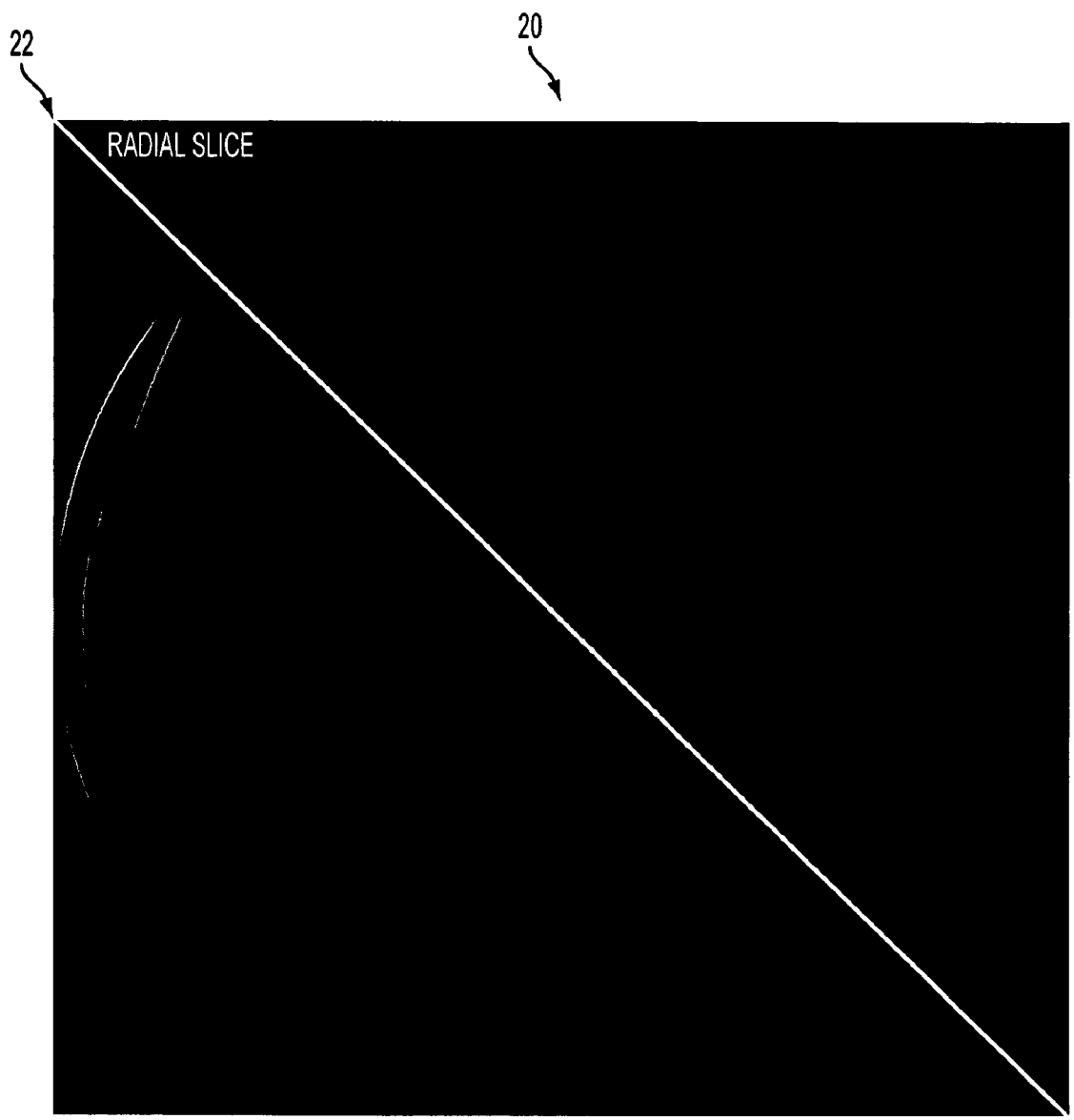
FIG. 2 is a simulated image that results when looking at a convex surface through a catadioptric single camera system having a cylinder with a mirrored inside surface in accordance with certain embodiments of the present invention.

FIG. 2 shows an example of an image 20 that may be obtained from a catadioptric single camera system having a cylinder with a mirrored inside surface. In image 20, the actual scene can be seen in a circular region near the middle of the image, and the reflections of the scene can be seen in the remaining portions of the image. Furthermore, as shown in FIG. 2, features such as the eyes and the nose appear multiple times along a radial slice 22 of the image.

Figure 3:
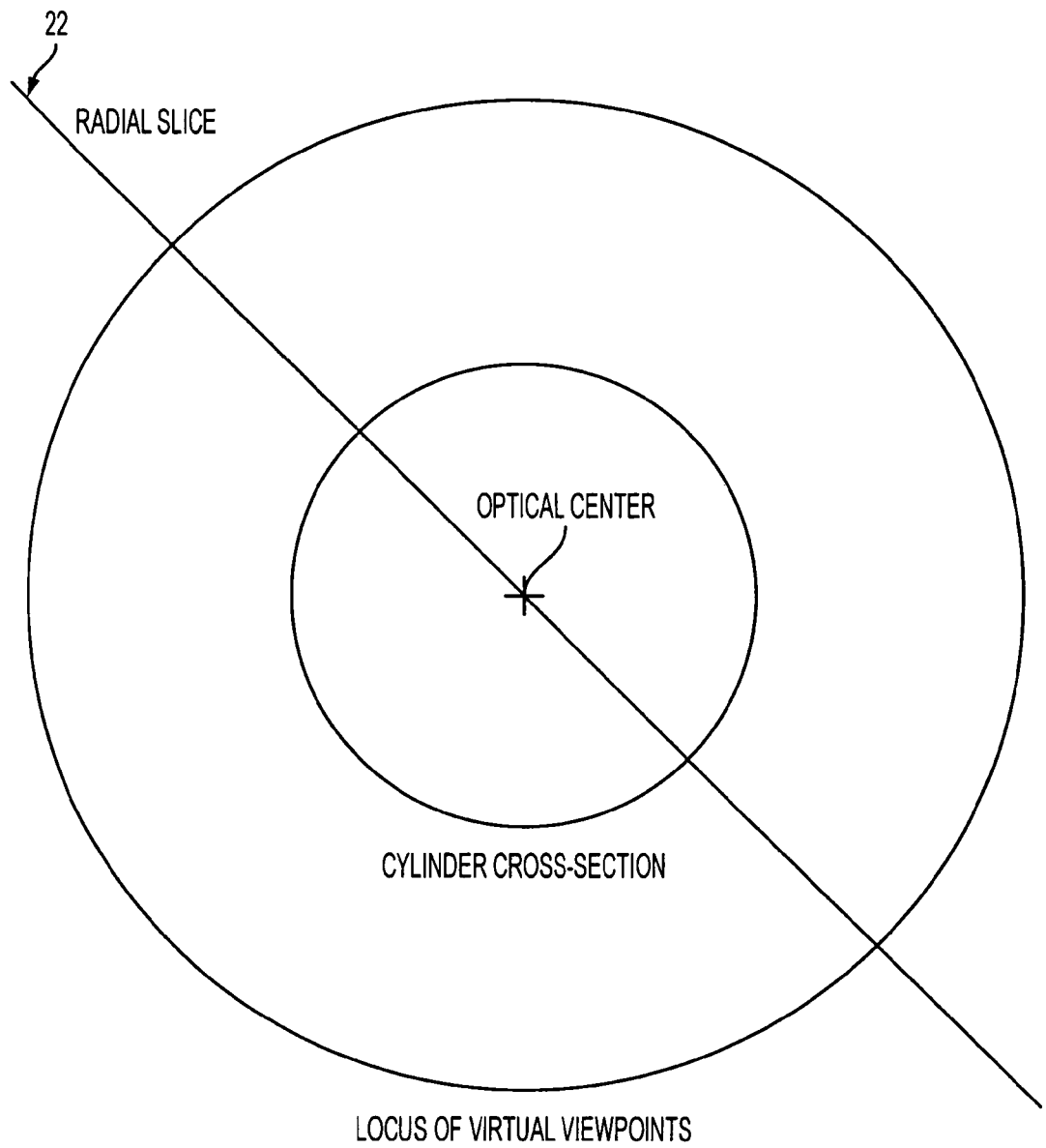
FIG. 3 is a diagram showing a radial slice, an optical center, cylinder cross-section, and a locus of virtual viewpoints in accordance with certain embodiments of the present invention.

Each radial slice of the image may be viewed as a stereo image observed from three collinear viewpoints—central viewpoint 100 and virtual viewpoints 110 and 120—and the entire image may be viewed as an image captured from a locus of circular viewpoints and the optical center of the imaging optics as shown in FIG. 3. One particular radial slice may contain information from all three viewpoints 110, 100, and 120 of a point in a scene of interest.

Figure 4:
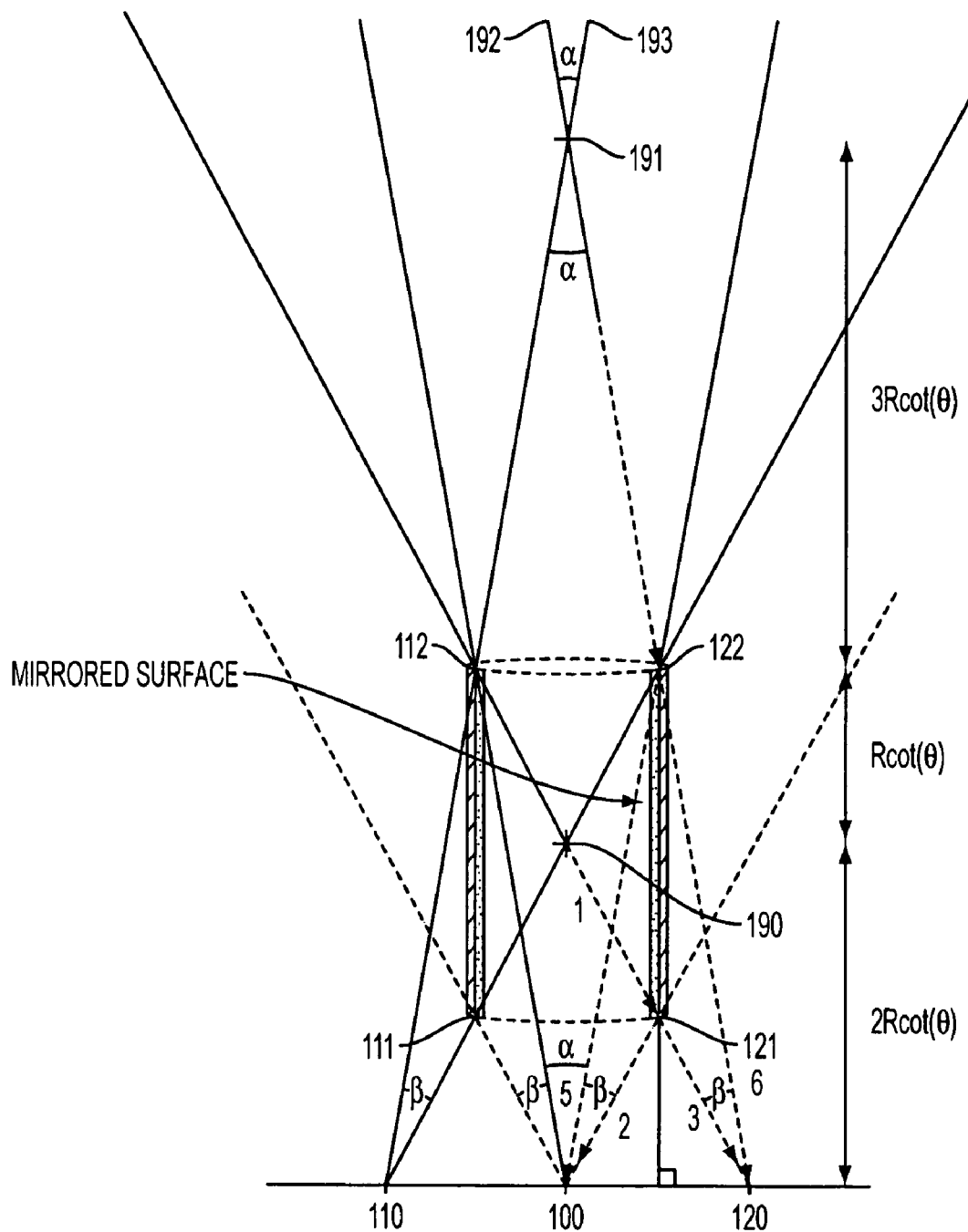
FIG. 4 is a diagram of a catadioptric single camera system having a cylinder with a mirrored inside surface in accordance with certain embodiments of the present invention, showing the field of views of the central and virtual viewpoints.

FIG. 4 shows effective fields of view for central viewpoint 100 and virtual viewpoints 110 and 120. The effective field of view of central viewpoint 100 can be represented as an angle spanned by α, and the effective fields of view of virtual viewpoints 110 and 120 can each be represented as an angle spanned by β. The angles spanned by the left and right side partitions of the actual field of view of the camera (defined as the actual field of view of the camera minus the effective field of view of central viewpoint 100) are equivalent to the angles spanned by the effective fields of view of virtual viewpoints 110 and 120 (β). Such equivalence can be realized by analyzing the incident rays of light at endpoints 121 and 122, the associated rays of light that reflect off the mirror surface defined by endpoints 121 and 122, and the associated rays of light that may have passed through endpoints 121 and 122 if the mirror surface were not present. Incident rays of light 1 and 4 reach endpoints 121 and 122, respectively. Rays 2 and 5 represent rays that may be reflected by the mirror surface, and rays 3 and 6 represent rays that may have passed through if the mirror surface were not present. The lengths of rays 2 and 3 are the same and the lengths of rays 5 and 6 are the same. As such, the triangle formed by central viewpoint 100, endpoint 121, and endpoint 122 is congruent to the triangle formed by virtual viewpoint 120, endpoint 121, and endpoint 122. Thus, the angle spanned by the effective field of view of virtual viewpoint 120 may be equivalent to the angle spanned by a side partition. As such, the actual field of view of the camera, spanned by an angle 2θ, defines the effective field of view of central viewpoint 100 (α) and the effective fields of view of virtual viewpoints 110 and 120 (β), and 2θ=α+2β.

Additionally, from equations [1] and [2], it follows that $$\alpha = 2\tan^{-1}\left(\frac{\tan\theta}{3}\right) \text{ and} \quad [3]$$

$$\beta = \theta - \tan^{-1}\left(\frac{\tan\theta}{3}\right) \quad [4]$$

Figure 5:
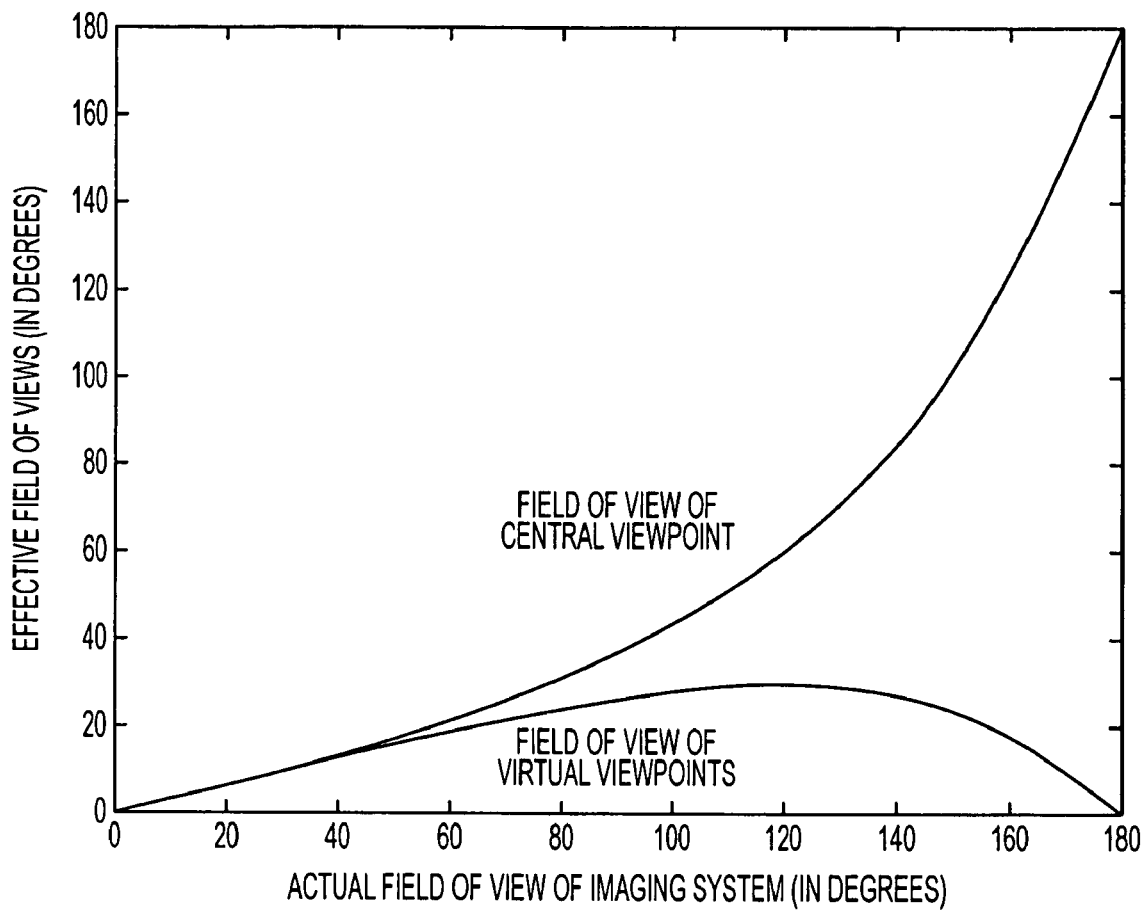
FIG. 5 is a plot of the fields of view of central and virtual viewpoints as a function of different values of the actual field of view of a catadioptric single camera system having a cylinder with a mirrored inside surface in accordance with certain embodiments of the present invention.
Figure 6:
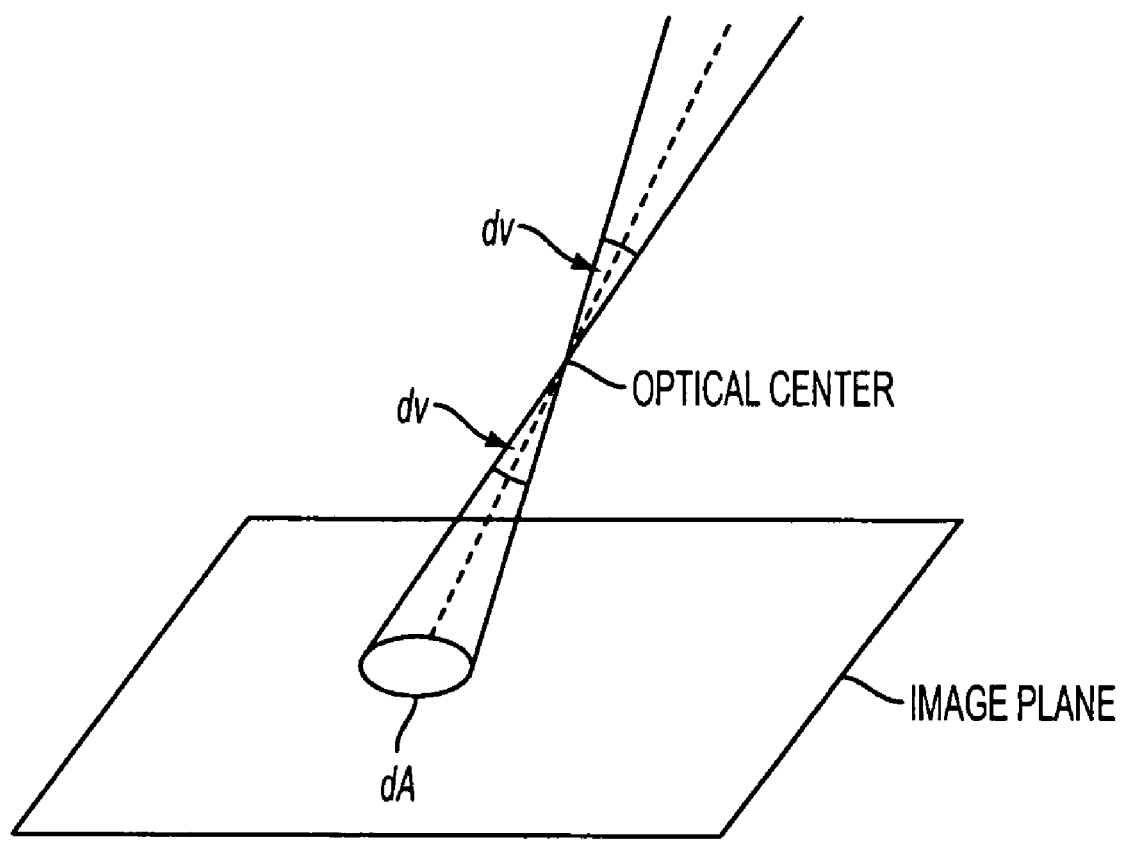
FIG. 6 is a diagram showing the resolution of a conventional camera.

As shown in FIG. 5, plotting the effective field of view of central viewpoint 100 (α) and the effective fields of view of virtual viewpoints 110 and 120 (β) as a function of the actual field of view of the camera (2θ) in accordance with equations [3] and [4] shows the following trend: β initially increases with increasing 2θ, reaches a maximum of 30° when 2θ is 120°, and then decreases, while α continues to increase with increasing 2θ.

To determine the location of a scene of interest in space where stereo images can be obtained, the intersections of the fields of view of central viewpoint 100 and virtual viewpoints 110 and 120 may be considered. FIG. 4 shows that a line defined by connecting virtual viewpoint 110 and endpoint 111 and a line defined by connecting virtual viewpoint 120 and endpoint 121 may intersect the optical axis at a point 190. Similarly, a line defined by connecting virtual viewpoint 110 and endpoint 112 and a line defined by connecting virtual viewpoint 120 and endpoint 122 intersect the optical axis at point 191. In the present example, the distance between point 190 and central viewpoint 100, is 2R cot(θ), and the distance between point 191 and central viewpoint 100 is 6R cot(θ).

Figure 4A:
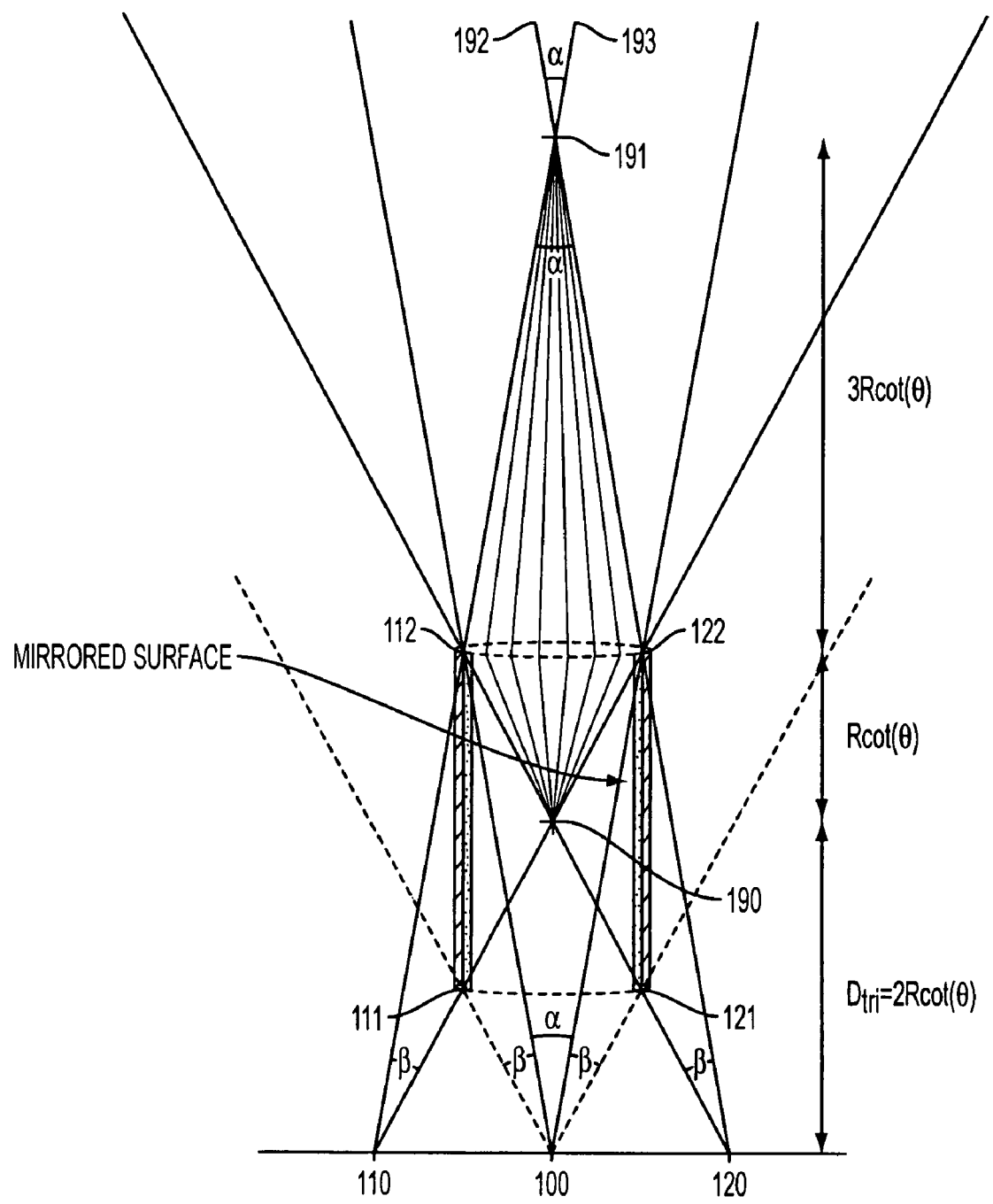
FIG. 4A is a diagram of a catadioptric single camera system having a cylinder with a mirrored inside surface in accordance with certain embodiments of the present invention, showing the trinocular stereo space.

Therefore, as shown in FIG. 4A, the trinocular stereo space, which is a space seen by all three viewpoints 100, 110, and 120, is a region within a quadrilateral defined by point 191, endpoint 112, point 190, and endpoint 122. The trinocular space in 3D may be obtained by rotating the quadrilateral defined by point 191, endpoint 112, point 190, and endpoint 122 about the optical axis. As such, two cones of radius R, whose bases lie on endpoints 112 and 122 define the trinocular space in 3D. The height of the cone with its apex pointing towards central viewpoint 100 is R cot(θ), while the height of the cone with its apex pointing away from central viewpoint 100 is 3 R cot(θ). Additionally, the distance of nearest trinocular space from central viewpoint 100 along the z-axis may be defined as $D_{tri}$. As shown before, $$D_{tri} = 2 R \cot(\theta) \quad (5)$$

Figure 4B:
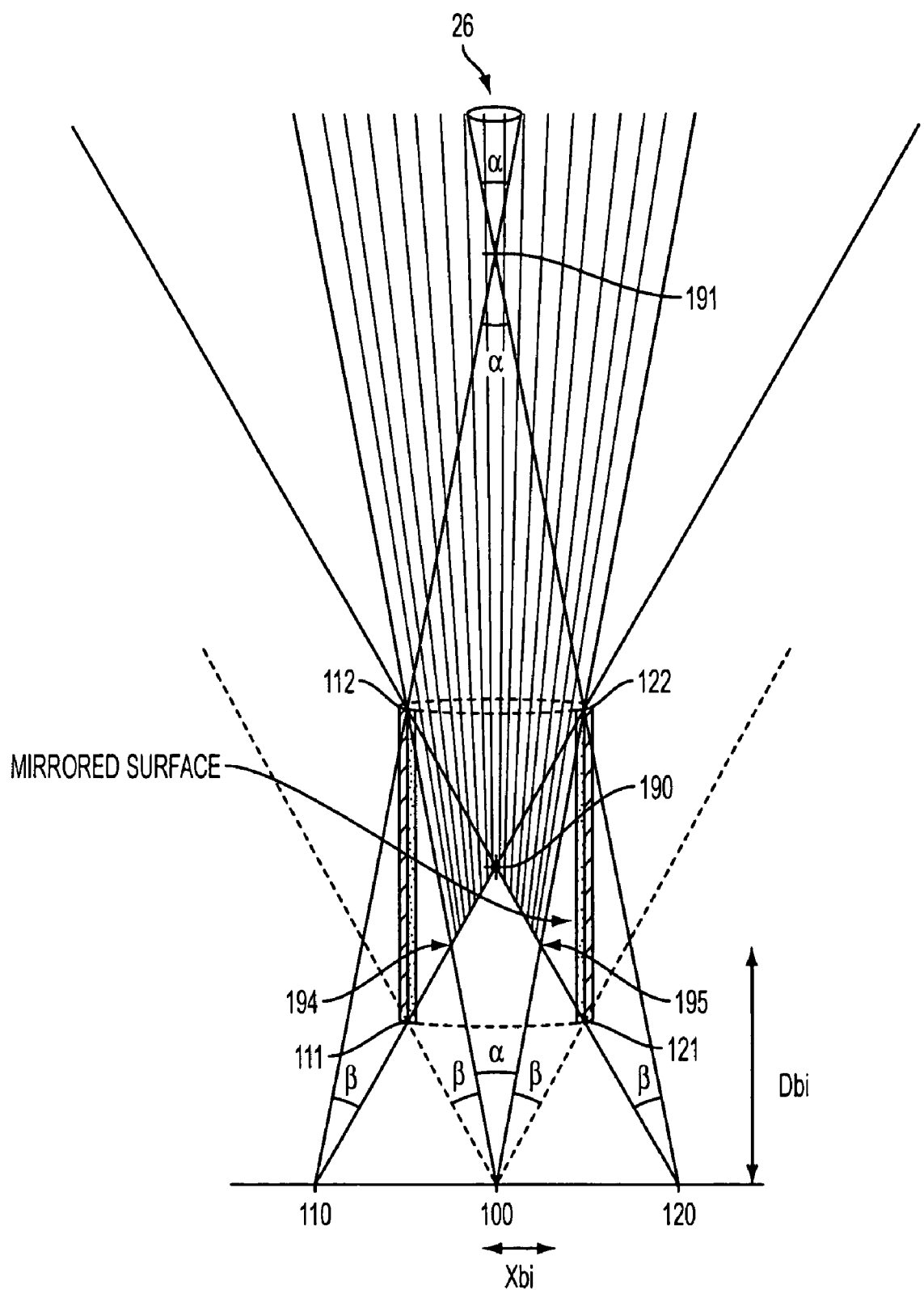
FIG. 4B is a diagram of a catadioptric single camera system having a cylinder with a mirrored inside surface in accordance with certain embodiments of the present invention, showing the binocular stereo space.

As shown in FIG. 4B, the binocular space, which is the space seen by at least two viewpoints, is the effective field of view of central viewpoint 100 minus two regions—a region outlined by points 192, 191, and 193; and a region outlined by central viewpoint 100 and points 194, 190, and 195. Since the triangle defined by endpoint 112, central viewpoint 100, and endpoint 122 and the triangle defined by endpoint 112, point 191, and endpoint 122 are congruent, the angle formed by endpoint 112, point 191, and endpoint 122 and the angle formed by points 192, 191, and 193 are both represented by α. Again, the binocular space in 3D may be obtained by rotating the binocular region described in 2D about the optical axis. This space is the result of overlaps of the field of views of one of the virtual viewpoints 110 or 120 with the field of view of the central viewpoint 100.

As shown, the nearest binocular space from central viewpoint 100 occurs at points 194 and 195. Points 194 and 195 are the intersection of the fields of view of virtual viewpoints 110 and 120 with the field of view of central viewpoint 100. The coordinates of points 194 and 195 can be shown to be [$-x_{bi}$, $D_{bi}$] and [$x_{bi}$, $D_{bi}$], respectively, wherein $$D_{bi} = \frac{2R}{\tan(\alpha/2) + \tan(\alpha/2 + \beta)} \text{ and} \quad [6]$$

$$x_{bi} = D_{bi} * \tan(\alpha/2) \quad [7]$$

It should be noted that in the strictly binocular space, the fields of view of virtual viewpoints 110 and 120 may not overlap with each other. Additionally, the effective field of view of central viewpoint 100 may contain the binocular stereo space, which, in turn subsumes the trinocular space.

In addition, certain embodiments of the present invention may possess foveated vision characteristics. To illustrate, if a feature on a plane parallel to an image plane, having a length dl, is imaged using a conventional camera, the length that it projects onto an image plane of the conventional camera can be shown to be mdl, wherein m is a constant scaling factor due to perspective projection. This projected length on the image plane may be the same regardless of where the feature is within the field of view of the camera.

However, if a same feature is imaged with a catadioptric single camera system having a cylinder with a mirrored inside surface in accordance with certain embodiments of the invention, the total length of its projections in a radial slice of an image plane may vary depending on the location of the feature in the field of view of the catadioptric single camera system. For example, for a particular radial slice, if a feature, having an orientation equal to a radial image slice under consideration, lies within the trinocular space, the feature may project as three distinct line segments in the radial slice. The three distinct line segments may occur once for each viewpoints 100, 110, and 120, each having a length of mdl. As such, the total length of the three projections may be 3 mdl. If the feature lies outside the trinocular space, but inside the binocular space, then the total length of the projections in a radial slice may be 2 mdl. If the feature lies outside the binocular space, but is visible to one viewpoint, the total length of the projection may be mdl.

Therefore, a scene feature in the trinocular space may project onto greater lengths on the corresponding radial slices as compared to identical features in the binocular stereo space, while a feature in the binocular stereo space may project onto greater lengths on the corresponding radial slices as compared to identical features in the monocular space.

Since the image captured by the catadioptric single camera system having a cylinder with a mirrored inside surface in accordance with certain embodiments of the invention, can be considered to be a combination of radial slices, it can be seen that features in the trinocular stereo space project onto greater areas as compared to identical features in the binocular stereo space, which in turn project onto greater areas as compared to identical features in the monocular space.

Since the trinocular, binocular, and monocular spaces form concentric regions in space about the optical axis, and the trinocular space lies within the binocular and monocular spaces, certain regions lying within the effective field of view of central viewpoint 100 may project onto more area on an image plane as compared to regions on the periphery.

Moreover, since the effective fields of view of virtual viewpoints 110 and 120 overlap in the trinocular space, wider baseline stereo triangulation for points in this space can be realized because the distance between viewpoints is at maximum 4 R. Consequently, a greater resolution in depth recovery may be attained in the trinocular space.

In the strictly binocular stereo space, however (i.e. excluding the trinocular space), because central viewpoint 100 and only one of the other virtual viewpoints 110 and 120 are involved, a lower baseline for stereo triangulation is realized from the 2 R separation distance of these points. Therefore, the binocular space may have lower resolution in depth recovery as compared to the trinocular space.

Since the trinocular space lies near the center of the actual field of view of the camera, a greater depth resolution can be attained near the center of the image. This property is very similar to that of a human visual system, wherein a greater visual perception in the central region of the field of view also exists. Such foveated vision characteristics can be considered a natural design result of catadioptric single camera systems having a cylinder with a mirrored inside surface.

The definition of resolution outlined by Baker and Nayar may be used to approximate the resolution along a radial slice of the image taken by catadioptric systems in accordance with certain embodiments of the present invention (see S. Baker and S. Nayar, "A theory of single-viewpoint catadioptric image formation," *International Journal of Computer Vision*, 35, pages 175-196, 1999, which is incorporated by reference herein in its entirety). Taking dA to be an infinitesimal area on an image plane which images an infinitesimal solid angle dv of the world, the resolution of a camera is defined as $$\frac{dA}{dv}.$$

Figure 7:
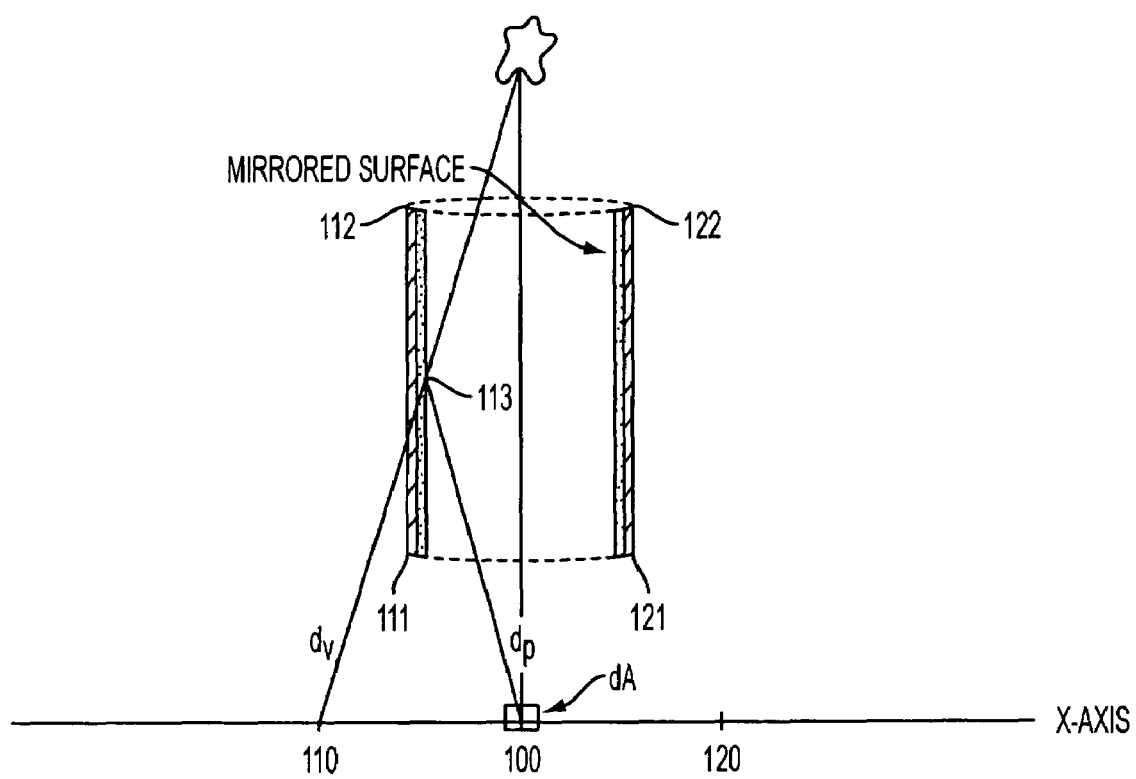
FIG. 7 is a diagram showing the resolution of a catadioptric single camera system having a cylinder with a mirrored inside surface in accordance with certain embodiments of the present invention.

As shown in FIG. 7, in a radial slice of an image plane that corresponds to central viewpoint 100, incident light rays may come directly from a scene of interest. Hence, the resolution for these points may be the same as that of the camera used.

Furthermore, light incident on a radial slice of an image plane that corresponds to virtual viewpoint 110 may come after one reflection in the mirror surface defined by endpoints 111 and 112. Hence, the resolution of catadioptric systems having a cylinder with a mirrored inside surface for these points may be approximated by the resolution of the camera, $$\frac{dA}{dv},$$

multiplied by a factor $$F = \frac{d_v^2}{d_p^2} \quad [8]$$

wherein $d_v$ is the distance from virtual viewpoint 110 to an arbitrary point 113 on the mirror surface, defined by endpoints 111 and 112, where the light hits before getting reflected and striking the center of dA, and $d_p$ is the distance from central viewpoint 100 to an arbitrary point 113 on the mirror surface, defined by endpoints 111 and 112, where the light hits before getting reflected and striking the center of dA. Because the mirror surface, defined by endpoints 111 and 112, divides the distance between central viewpoint 100 and virtual viewpoint 110 into two equal parts, $d_v$ is equal to $d_p$. As such, F is unity. The same analysis can be performed for the part of the radial slice that corresponds to virtual viewpoint 120. As such, the resolution for a radial slice of an image plane that corresponds to virtual viewpoints 110 or 120, is also equal to the resolution of the actual camera used. Therefore, for each radial slice of the image plane, the resolution of the catadioptric single camera system having a cylinder with a mirrored inside surface can be shown to be approximately the same as that of the actual camera used.

Figure 8A:
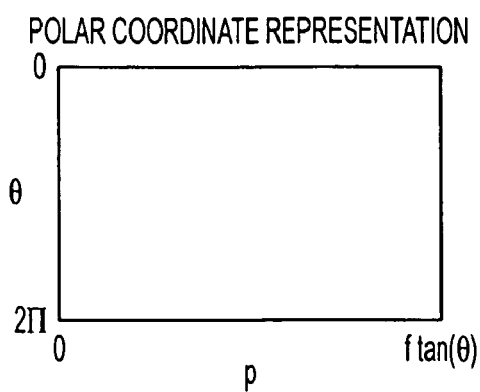
FIG. 8 shows certain aspects of how images obtained with a catadioptric single camera system having a cylinder with a mirrored inside surface can be processed in accordance with certain embodiments of the present invention.
Figure 8B:
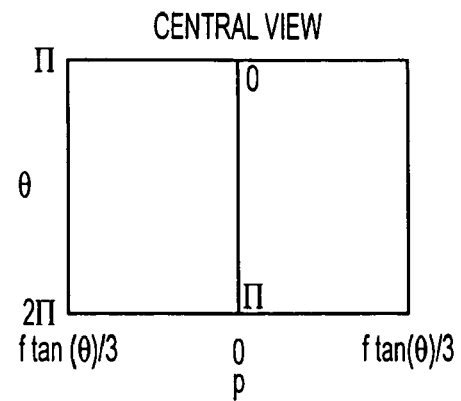
Figure 8C:
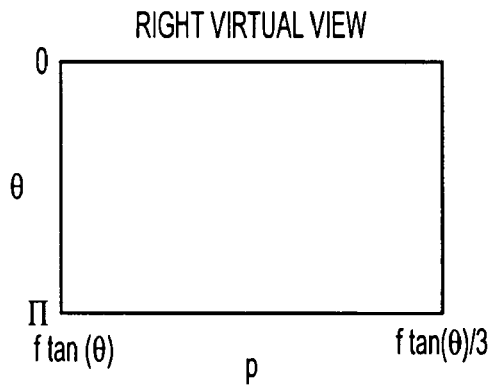
Figure 8D:
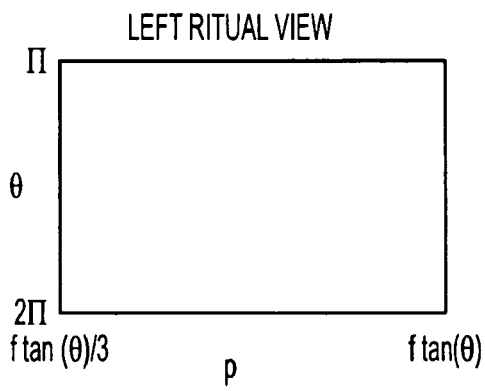

Additionally, the 3D structure of a scene may be recovered as follows from the images obtained with a catadioptric single camera system having a cylinder with a mirrored inside surface in accordance with certain embodiments of the present invention. First, a captured image can be represented in polar coordinates, ρ and θ, as shown in FIG. 8a. Note that the length of a radial slice of the image can be shown to be 2 f tan(θ), wherein f is the focal length of the camera. Additionally, the effective image planes for central viewpoint 100 and virtual viewpoints 110 and 120 along a radial slice of the image can be shown to be equal, each having a length of 2 f tan(θ)/3. As such, the transformed image can then be divided into sub-images corresponding to the various viewpoints 100, 110, and 120. For example, a sub-image corresponding to central viewpoint 100 may be a set of pixels whose ρ is less than or equal to f tan(θ)/3 from the optical center and called the central view, as shown in FIG. 8b. Note the central view spans 2 f tan(θ)/3. A sub-image corresponding to the locus of circular viewpoints may contain pixels with p values between f tan(θ)/3 and f tan(θ). This can be further divided into two sub-images—pixels that lie in the first two quadrants (0≦θ<π), called the right virtual view (see FIG. 8c) and pixels that lie in the last two quadrants (π≦θ<2π), called the left virtual view (see FIG. 8d). The left and right virtual views may then be flipped about the vertical axis to undo the effect of reflection in the mirror.

Figure 8E:
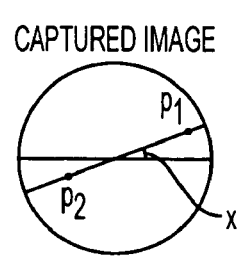
Figure 8E:
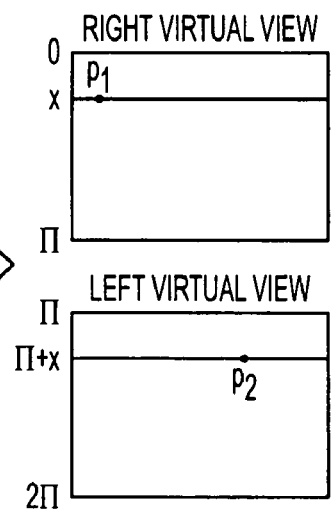

The polar coordinate transformation, as described above, may convert radial epipolar lines to horizontal lines. As illustrated in FIG. 8e, $p_1$ and $p_2$ are defined as two corresponding points for virtual viewpoints 110 and 120, on a radial slice making an angle χ with the x-axis, wherein $p_1$ is in one of the first two quadrants at an angle χ and $p_2$ is in one of the last two quadrants at an angle χ+π. As a consequence of the manner in which the left and right virtual views have been created, $p_1$ and $p_2$ can be shown to lie on the same row in the left and right virtual views. Hence, the epipolar lines for all virtual viewpoints corresponding to virtual viewpoints 110 and 120 are parallel to each other and on the same horizontal scan line when represented in polar coordinates. In a similar manner, the epipolar lines of central viewpoint 100 and one of virtual viewpoints 110 or 120 can also be shown to be parallel to each other and on the same horizontal scan line when represented in polar coordinates. Thus, mapping a captured image having radial epipolar lines into a polar representation can provide a set of rectified stereo images. Conventional stereo matching algorithms, such as the widely available software packages StereoMatcher 1.0 or MATCH, may be employed to compute depth information.

StereoMatcher 1.0 contains implementation of stereo algorithms described by D. Scharstein and R. Szeliski, "A taxonomy and evaluation of dense two-frame stereo," *Technical Report, MSR-TR*-2001-81, 2001; which is hereby incorporated by reference herein in its entirety. MATCH contains implementation of stereo algorithms described by V. Kolmogorov, R. Zabih, and S. Gortler, "Multi-camera scene reconstruction via graph cuts," *European Conference on Computer Vision*, May 2002; V. Kolmogorov and R. Zabih, "Computing visual correspondence with occlusions using graph cuts," *International Conference on Computer Vision*, July 2001; and Y. Boykov, 0. Veksler, and R. Zabih, "Markov random fields with efficient approximations," *Computer Vision and Pattern Recognition Conference*, June, 1998; which are hereby incorporated by reference herein in their entireties.

Referring to FIG. 4B again, the effective fields of view of virtual viewpoints 110 and 120 may be verged which provides high resolution in depth recovery for nearby objects. Also due to this vergence, regions near the center of the field of view of the camera (see cone 26) may no longer be visible after a certain depth in the virtual views.

Figure 9:
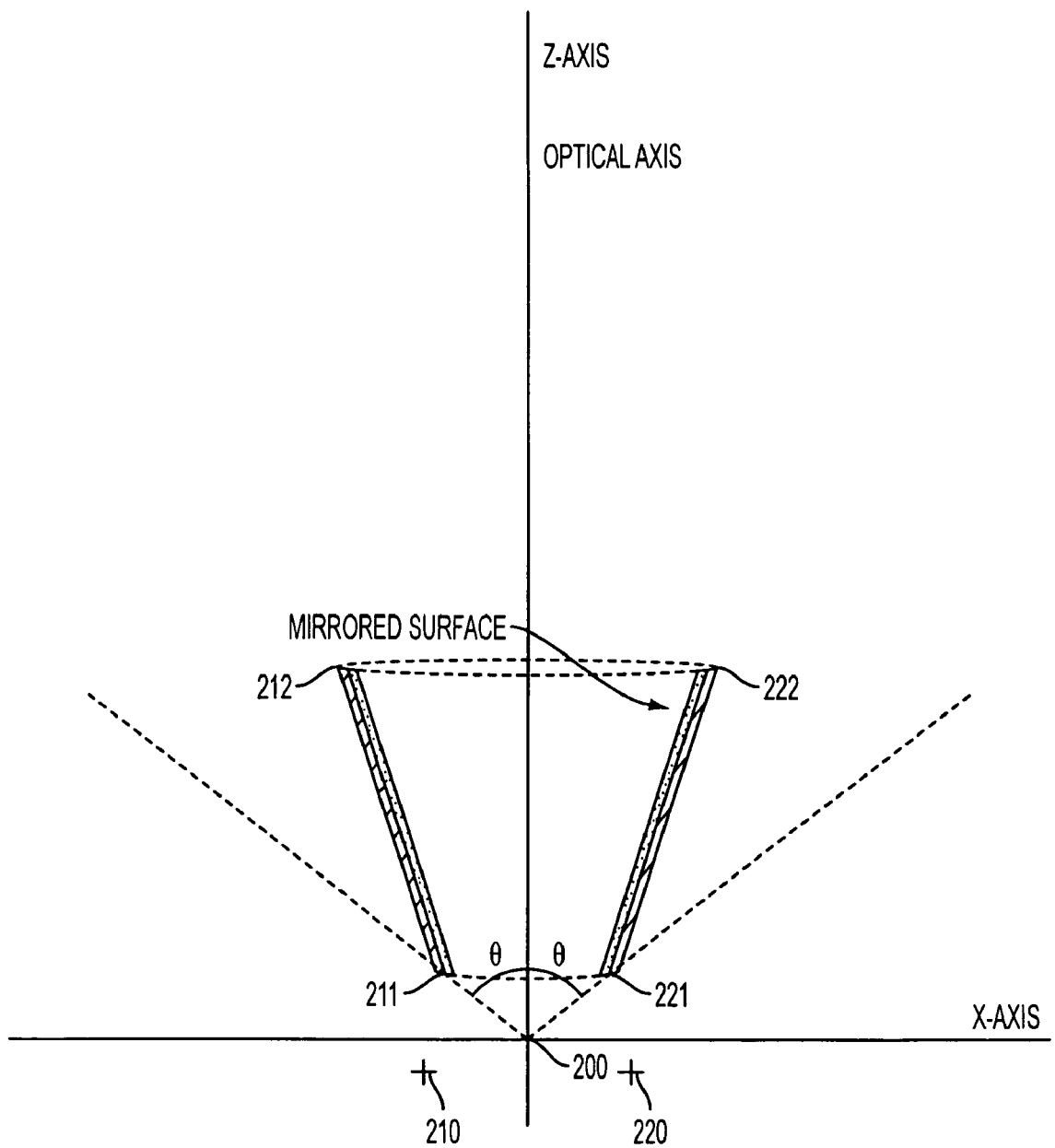
FIG. 9 is a diagram of a catadioptric single camera system having a truncated cone with a mirrored inside surface in accordance with certain embodiments of the present invention.

As shown in FIG. 9, other embodiments of the present invention are directed to catadioptric single camera systems having a cone with a mirrored inside surface. The cone may be truncated near the apex of the cone, i.e., the cone does not come to a point as shown. Since the mirrored surface is no longer parallel to the optical axis of the imaging optics, although still concentric, the fields of view of virtual viewpoints may be designed to not verge, which may provide forward looking virtual viewpoints 210 and 220.

As described before, the virtual viewpoints may be obtained by 1) extending the mirror surface towards the x-axis, 2) forming a perpendicular line from central viewpoint 200 to the extended mirror surface, 3) measuring the distance, D, from central viewpoint 200 to the intersection point of the perpendicular line and the extended mirror surface, and 4) placing a virtual viewpoint at a point along the perpendicular line at a distance of D from the extended mirror surface.

Figure 10:
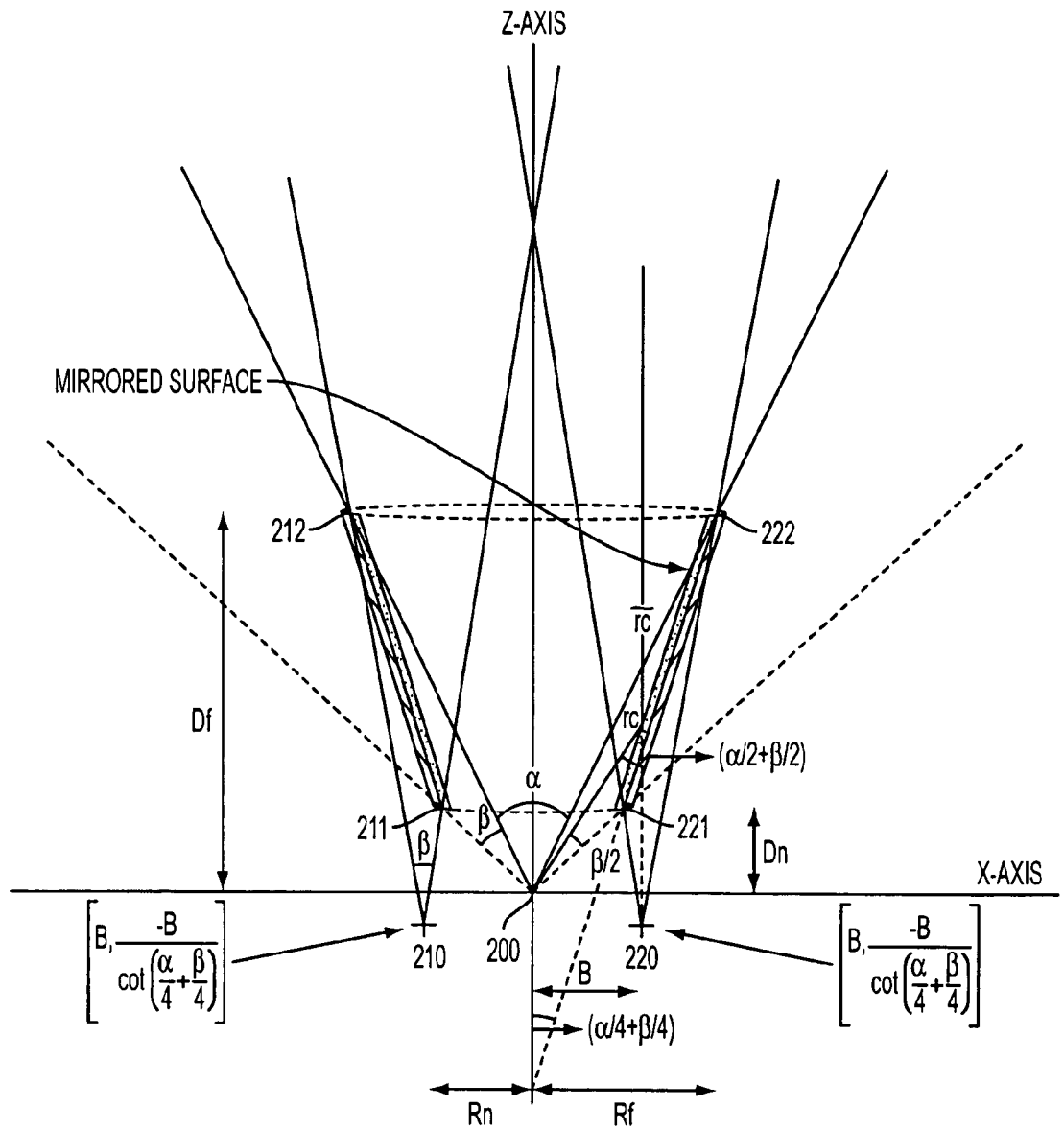
FIG. 10 is a diagram of a catadioptric single camera system having a truncated cone with a mirrored inside surface in accordance with certain embodiments of the present invention, showing the fields of view of the central and virtual viewpoints.

As shown in FIG. 10, $\alpha$ can be defined as an angle spanning the effective field of view of central viewpoint 200 and $\beta$ can be defined as an angle spanning the effective field of view of virtual viewpoints 210 and 220. As previously described, the angle spanned by each side partitions is also $\beta$. As such, in the configuration shown, $$\alpha + 2\beta = 2\theta \quad (9)$$

The effective field of view of central viewpoint 200 ($\alpha$) preferably just grazes the far ends of the truncated cone, while the side partitions of the actual field of view of the camera ($\beta$) reflect off the mirrored surface of the cone.

The slope of the sides of the truncated cone can be specified to provide a forward-looking field of view of virtual viewpoints 210 and 220. Considering a central ray $r_c$ in the right side partition, as shown in FIG. 10, the reflected ray $\tilde{r}_c$ becomes the central ray of the field of view of virtual viewpoint 220, wherein the reflected ray $\tilde{r}_c$ can be specified to be parallel to the optical axis of the camera to provide a forward looking virtual viewpoint 220. To get $\tilde{r}_c$ which is parallel to the z-axis, the mirror surface defined by endpoints 221 and 222 reflects $r_c$, wherein $r_c$ forms an angle of $(\alpha+\beta)/2$ with respect to the z-axis. Therefore, the mirror surface defined by endpoints 221 and 222 makes an angle of $(\alpha+\beta)/4$ with the z-axis.

As shown in FIG. 10, to specify the position of the truncated cone, the distance between virtual viewpoints 210 and 220 and central viewpoint 200 along the x-axis can be specified to be B. As such, the location of virtual viewpoint 210 can now be represented by $$\left(-B, \frac{-B}{m}\right)$$

and the location of virtual viewpoint 220 can now be represented by $$\left(B, \frac{-B}{m}\right),$$

wherein $$m = \cot\left(\frac{\alpha}{4} + \frac{\beta}{4}\right).$$

As such, virtual viewpoints 210 and 220 are located behind central viewpoint 200.

As before, the actual field of view of the camera ($2\theta$) may just graze endpoints 211 and 221 of the truncated cone. As such, in order to obtain virtual viewpoints 210 and 220 as given above, the radius of the truncated cone near endpoints 211 and 221 can be shown to be $$R_n = \frac{B\sin\left(\frac{\alpha}{2} + \beta\right)}{2\cos\left(\frac{\alpha}{4} + \frac{\beta}{4}\right)\sin\left(\frac{\alpha}{4} + \frac{3\beta}{4}\right)} \quad [10]$$

and the location of endpoints 211 and 221 of the truncated cone can be shown to be at a distance $$D_n = \frac{B\cos\left(\frac{\alpha}{2} + \beta\right)}{2\cos\left(\frac{\alpha}{4} + \frac{\beta}{4}\right)\sin\left(\frac{\alpha}{4} + \frac{3\beta}{4}\right)} \quad [11]$$

from the x-axis.

Similarly, the effective field of view of central viewpoint 200 ($\alpha$) can just graze endpoints 212 and 222 of the truncated cone. As such, the radius of the truncated cone near endpoints 212 and 222 can be shown to be $$R_f = \frac{B\sin\left(\frac{\alpha}{2}\right)\sin\left(\frac{\alpha}{4}+\frac{\beta}{4}\right)}{\sin\left(\frac{\alpha}{2}+\frac{\beta}{2}\right)\sin\left(\frac{\alpha}{4}-\frac{\beta}{4}\right)} \quad [12]$$

and the location of endpoints 212 and 222 of the truncated cone can be shown to be at a distance $$D_f = \frac{B\cos\left(\frac{\alpha}{2}\right)\sin\left(\frac{\alpha}{4}+\frac{\beta}{4}\right)}{\sin\left(\frac{\alpha}{2}+\frac{\beta}{2}\right)\sin\left(\frac{\alpha}{4}-\frac{\beta}{4}\right)} \quad [13]$$

from the x-axis.

The height of the truncated cone can then be represented by subtracting equation [11] from equation [13], as shown below:

$$H = D_f - D_n \quad (14)$$

Figure 11:
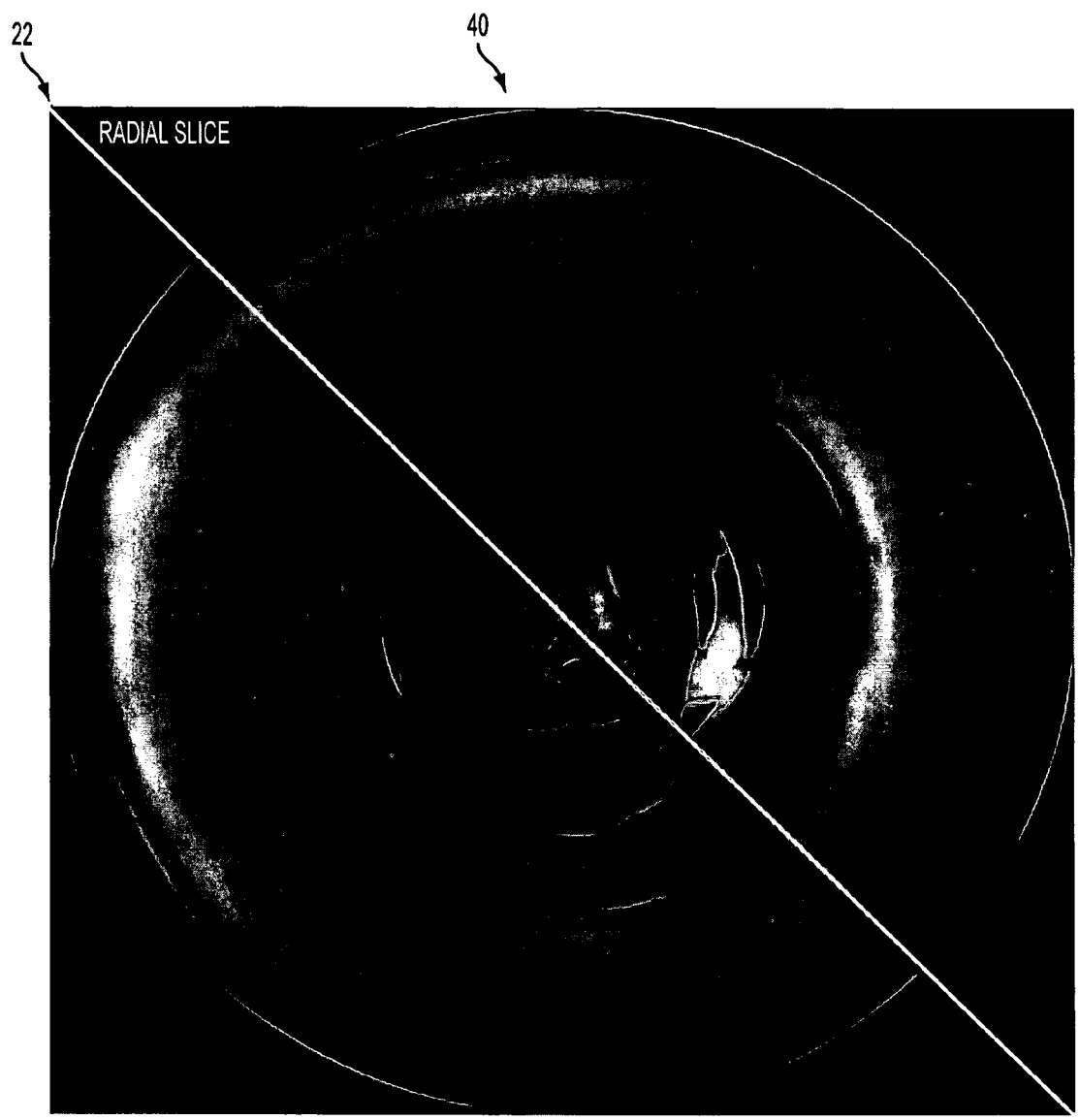
FIG. 11 is a simulated image that results when looking at a convex surface through a system having a truncated cone with a mirrored inside surface in accordance with certain embodiments of the present invention.

FIG. 11 shows an example of an image 40 that may be obtained from a catadioptric single camera system having a truncated cone with a mirrored inside surface. In the image 40, the actual scene can be seen in a circular region near the middle of the image, and the reflections of the scene can be seen in the remaining portions of the image. As illustrated by looking along one radial slice 22 of the image 40, features such as the eyes and the nose appear multiple times.

Each radial slice 22 of the image 40 may be viewed as a stereo image observed from three collinear viewpoints—central viewpoint 200 and virtual viewpoints 210 and 220—and the entire image may be viewed as an image captured from a locus of circular viewpoints and the optical center of the imaging optics as shown in FIG. 3. One particular radial slice may contain information from all three viewpoints 210, 200, and 220 of a point in a scene of interest.

The effective fields of view of central viewpoint 200 and virtual viewpoints 210 and 220 may further be specified by examining equations [12] and [13]. If β is greater than α, then $R_f$ and $D_f$ may both be less than 0. This physically translates to endpoints 212 and 222 of the truncated cone being behind the entrance pupil of the camera (located at central viewpoint 200), which is not a realistic design. If α is equal to β, then $R_f$ and $D_f$ each approach infinity, and also correspond to an unrealistic cone design. Therefore, for practical cone designs, α is greater than β.

Figure 12:
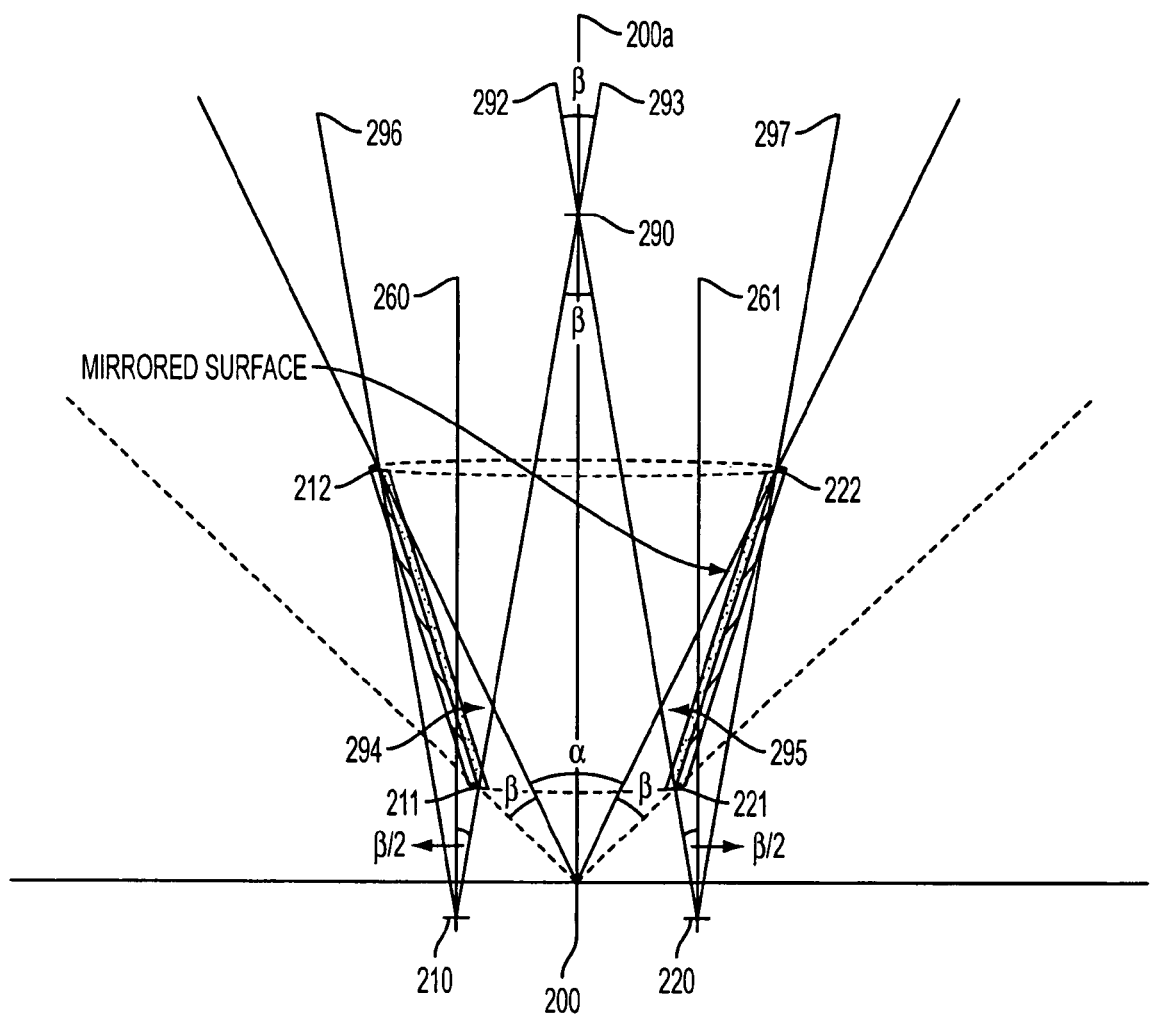
FIG. 12 is a diagram of a catadioptric single camera system having a truncated cone with a mirrored inside surface in accordance with certain embodiments of the present invention, showing the resulting trinocular and binocular stereo spaces in 2D.
Figure 12A:
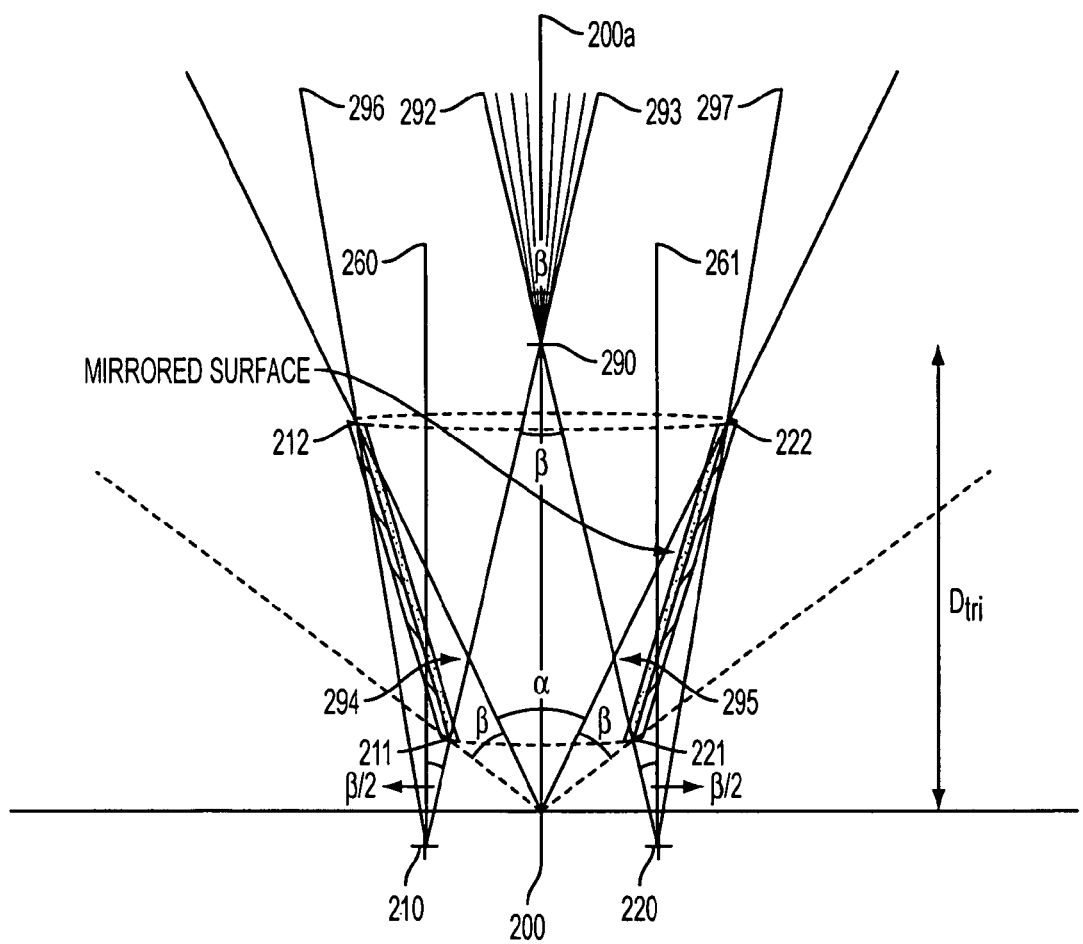
FIG. 12A is a diagram of a catadioptric single camera system having a truncated cone with a mirrored inside surface in accordance with certain embodiments of the present invention, showing the trinocular stereo space.

Referring to FIG. 12A, the trinocular space is an infinite space that lies between a line defined by points 290 and 292 and a line defined by points 290 and 293. A line defined by virtual viewpoint 210 and endpoint 211 and a line defined by virtual viewpoint 220 and endpoint 221 both meet the optical axis at point 290. As shown, $D_{tri}$ is the distance of nearest trinocular space from central viewpoint 200 along the z-axis, and may be shown to be $$D_{tri} = \frac{B\cos\left(\frac{\alpha}{4}+\frac{3\beta}{4}\right)}{\cos\left(\frac{\alpha}{4}+\frac{\beta}{4}\right)\sin\left(\frac{\beta}{2}\right)} \quad [15]$$

It can further be seen that the angle defined by point 260, virtual viewpoint 210, and point 290 is equal to β/2, which in turn is equal to the angle defined by point 200a, point 290, and point 293. Similarly, the angle defined by point 261, virtual viewpoint 220, and point 290 is equal to β/2, which in turn is equal to the angle defined by point 200a, point 290, and point 292. Therefore, the angle defined by point 292, point 290, and point 293 is equal to β. As illustrated in FIG. 12A, the trinocular stereo space in 3D can thus be shown to be an infinite cone having a field of view of β with its apex at 290 pointing toward central viewpoint 200 and its axis coincident with the optical axis of the camera.

Figure 12B:
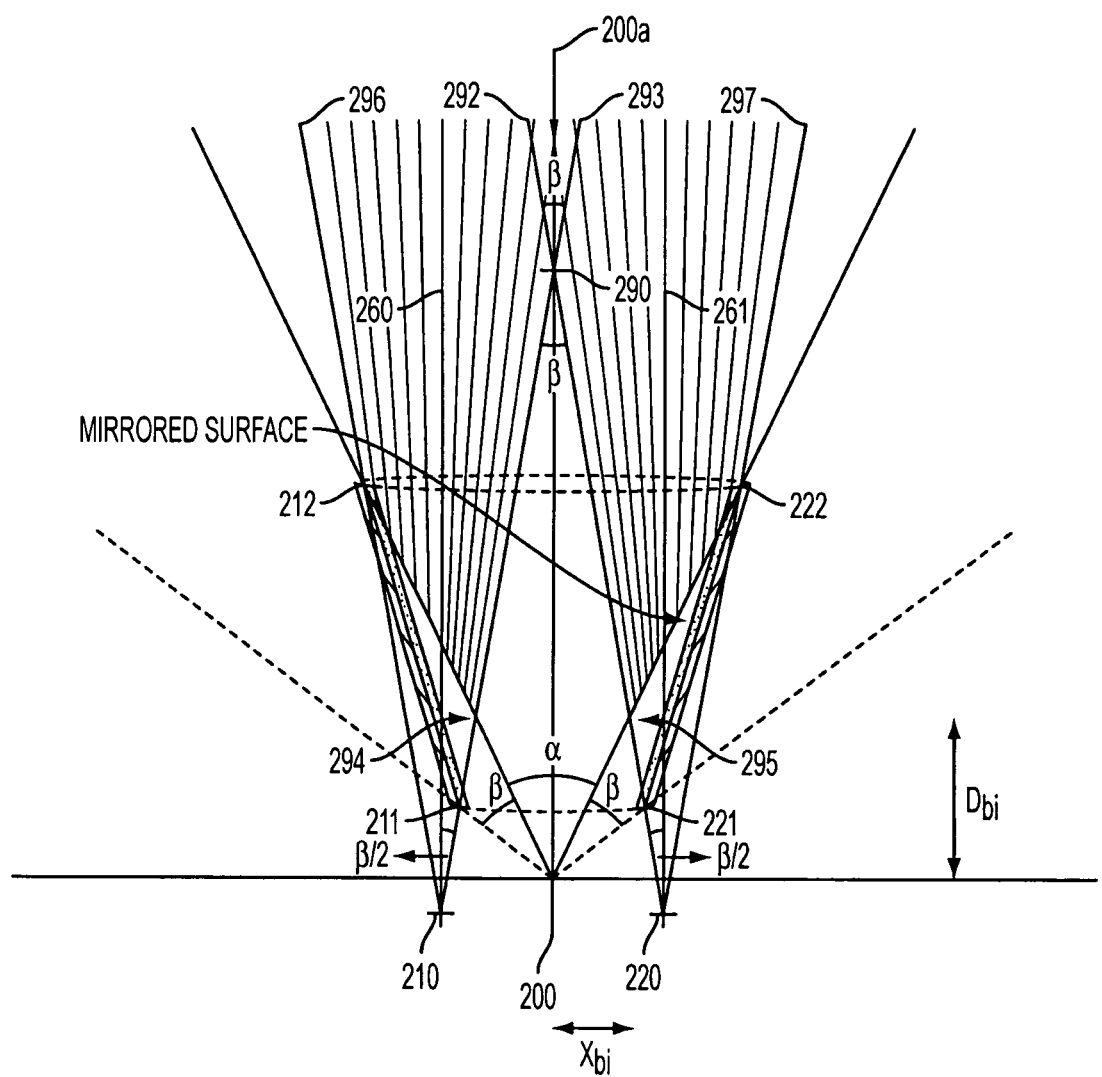
FIG. 12B is a diagram of a catadioptric single camera system having a truncated cone with a mirrored inside surface in accordance with certain embodiments of the present invention, showing the binocular stereo space.

Referring to FIG. 12B, the binocular space is an infinite space that lies between a region defined by connecting point 296, endpoint 212, point 294, point 290, point 295, endpoint 222, and point 297. As shown, the nearest binocular space from central viewpoint 200 occurs at points 294 and 295, wherein points 294 and 295 are the intersection of the fields of view of virtual viewpoints 210 and 220 with the field of view of central viewpoint 200. The coordinates of points 294 and 295 can be shown to be [$-x_{bi}$, $D_{bi}$] and [$x_{bi}$, $D_{bi}$], respectively, wherein $$D_{bi} = B * \frac{1 - \tan(\beta/2)\tan(\alpha/4 + \beta/4)}{\tan(\alpha/2) + \tan(\beta/2)} \quad \text{and} \quad [16]$$

$$x_{bi} = D_{bi} * \tan(\alpha/2) \quad [17]$$

As such, the trinocular space can be viewed as a proper subset of the binocular space, and the strictly binocular space comprise overlaps of the effective field of views of virtual viewpoints 210 or 220, and the effective field of view of central viewpoint 200.

From the discussion presented above, it follows that catadioptric single camera systems having a truncated cone with a mirrored inside surface in accordance with certain embodiments of the present invention also possess foveated vision characteristics. The trinocular, binocular, and monocular spaces form concentric regions in space about the optical axis, wherein the trinocular space lies within the binocular space and the binocular space lies within the monocular space. As a result, points of a scene in the center of the camera's field of view can project onto larger areas on an image plane as compared to identical regions in the periphery. Furthermore, in the trinocular space, wider baseline stereo triangulations may be used, which can allow higher depth resolution.

Figure 13:
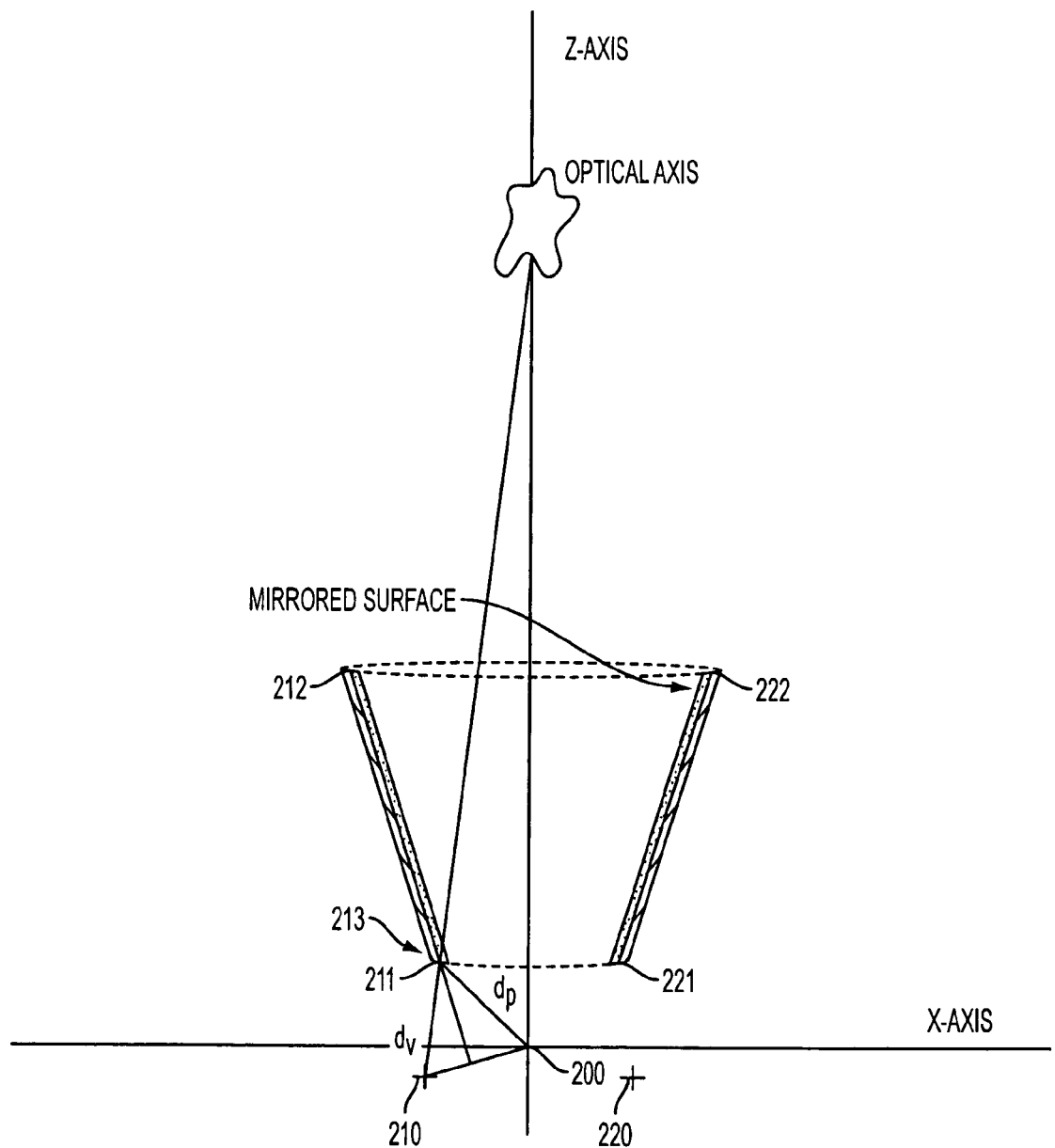
FIG. 13 is a diagram showing the resolution of a catadioptric single camera system having a truncated cone with a mirrored inside surface in accordance with certain embodiments of the present invention.

The resolution in each radial slice of catadioptric single camera systems having a truncated cone with a mirrored inside surface may also be approximately equal to the resolution of the camera used. As shown in FIG. 13, the light incident on points on a radial slice of an image plane that are part of central viewpoint 200 may come directly from the scene. Hence, the resolution for these points may be approximately the same as that of the camera used.

For the light incident on points on a radial slice of an image plane that are part of virtual viewpoints 210 or 220, only virtual viewpoint 210 is discussed in FIG. 13 for clarity. A line formed by endpoints 211 and 212 divides a line joining central viewpoint 200 and virtual viewpoint 210 in two equal parts. As such, $d_v$, which is the distance between virtual viewpoint 210 and an arbitrary point 213 on a mirror surface defined by endpoints 211 and 212, is equal to $d_p$, which is the distance between central viewpoint 200 and an arbitrary point 213 on a mirror surface defined by endpoints 211 and 212. Thus, $$F = \frac{d_v^2}{d_p^2}$$

can again be shown to be equal to unity. Hence, the resolution for the points on a radial slice of an image plane that are part of virtual viewpoints 220 or 220 may also be approximately equal to the camera used.

Processing of the image captured with catadioptric single camera systems having a truncated cone with a mirrored inside surface in accordance with certain embodiments of the present invention is discussed next. As discussed above, transforming the captured image into polar coordinates and subdividing the transformed image into central view, left virtual view, and right virtual view may also give results where corresponding projections lie on the same horizontal scan lines.

Figure 14:
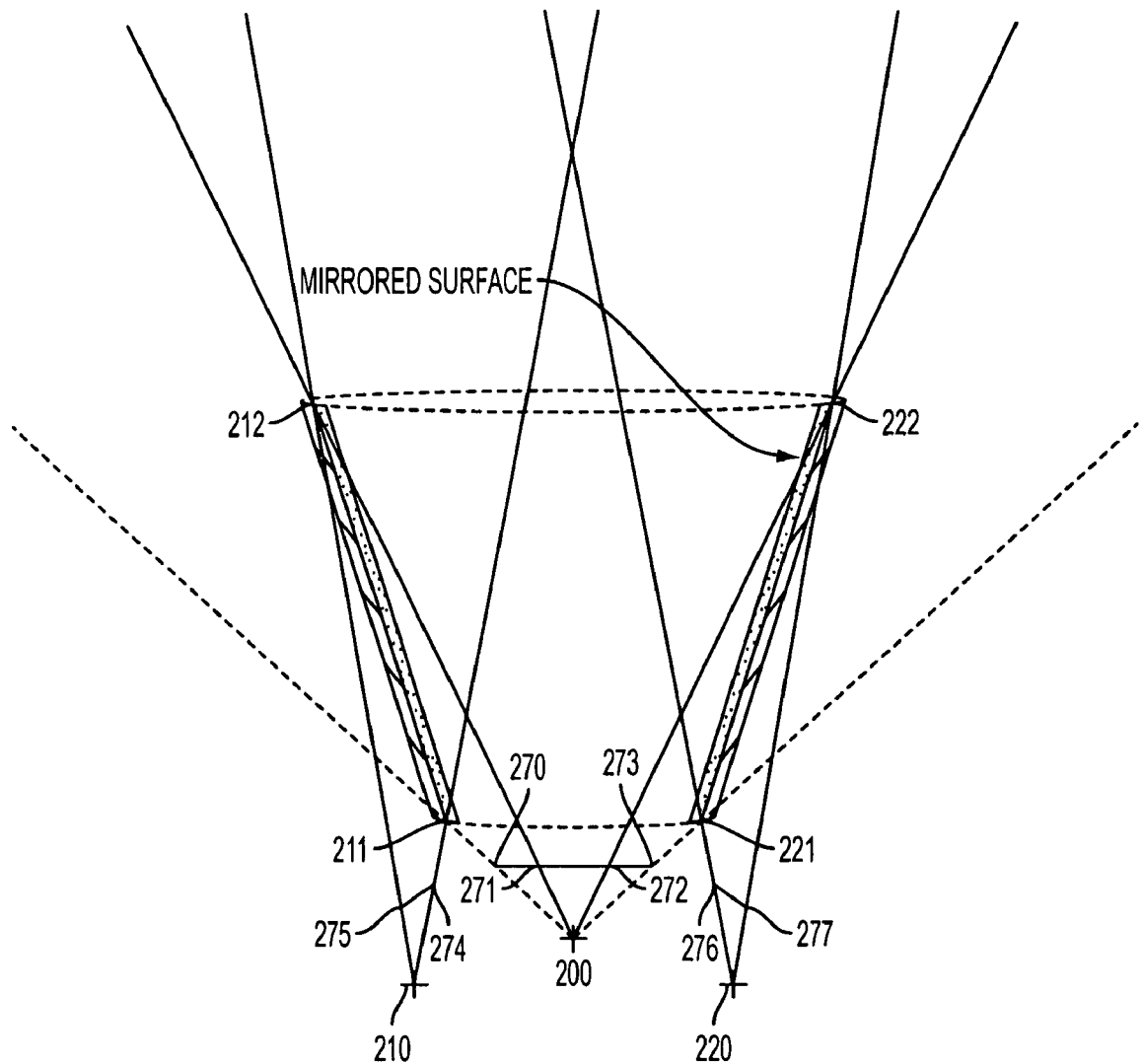
FIG. 14 is a diagram showing an image plane for a radial slice of a central viewpoint and effective image planes for a radial slice of virtual viewpoints captured with a catadioptric single camera system having a truncated cone with a mirrored inside surface in accordance with certain embodiments of the present invention.

However, the division of the image into central view, left virtual view, and right virtual view may depend on the parameters of the truncated cone used. As shown in FIG. 14, a line joining points 270 and 273 may represent an image plane of the camera in one radial slice. A line joining points 270 and 271 may represent a portion of an image plane that corresponds to the left partition of the actual field of view of the camera; a line joining points 271 and 272 may represent a portion of an image plane that corresponds to the effective field of view of central viewpoint 200; and a line joining points 272 and 273 may represent a portion of an image plane that corresponds to the right partition of the actual field of view of the camera. It can be noted that the length of the line joining points 270 and 271, the length of the line joining points 271 and 272, and the length of the line joining points 272 and 273 may depend on the values of α and β.

Additionally, as shown in FIG. 14, by reflecting a line joining points 270 and 271 in the mirror surface defined by endpoints 211 and 212, a line joining points 274 and 275 may be obtained. The line joining points 274 and 275 may represent an effective image plane for virtual viewpoint 210. Similarly, by reflecting a line joining points 272 and 273 in the mirror surface defined by endpoints 221 and 222, a line joining points 277 and 276 may be obtained. The line joining points 277 and 276 may represent an effective image plane for virtual viewpoint 220.

Thus, for viewpoints 200, 210, and 220, the following may be noted: 1) virtual viewpoints 210 and 220 are behind central viewpoint 200, and 2) a relative rotation between effective image planes of viewpoints 200, 210, and 220 may exist. As a result, a feature found in a scene of interest may look different in the images corresponding to viewpoints 200, 210, and 220. This may cause problems in finding corresponding features when matching a central view with a right or left virtual view, or when matching a left virtual view with a right virtual view.

Figure 14A:
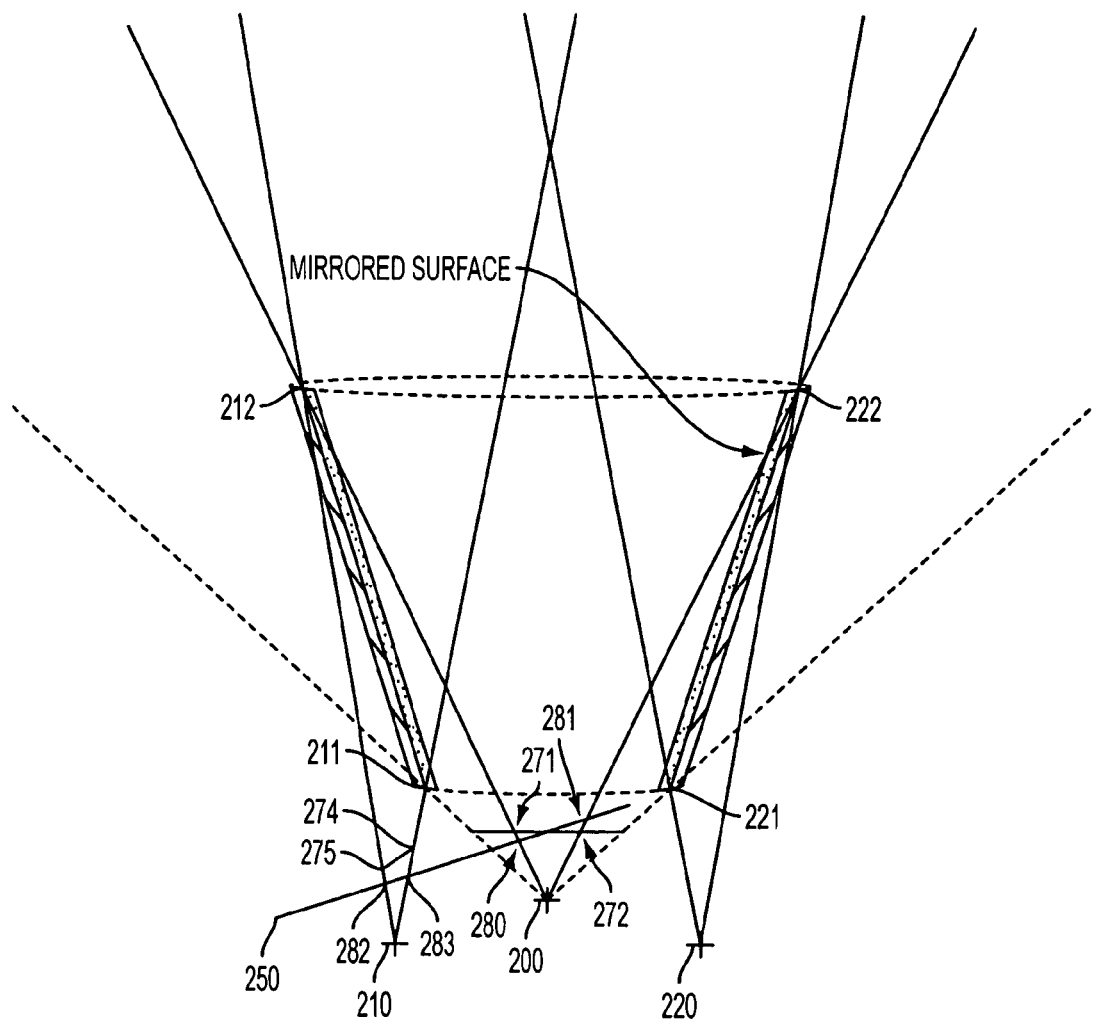
FIG. 14A is a diagram showing how an image captured with a catadioptric single camera system having a truncated cone with a mirrored inside surface in accordance with certain embodiments of the present invention may be re-sampled by projecting a radial slice onto a line parallel to the line joining the viewpoints.

As such, as shown in FIG. 14A, central view and left virtual view may be re-sampled by projecting each radial slice onto a line that is parallel to a line joining central viewpoint 200 and virtual viewpoints 210. For instance, when matching a central view (which may correspond to an image observed from central viewpoint 200) and a left virtual view (which may correspond to an image observed from virtual viewpoint 210), image in a radial slice corresponding to central viewpoint 200 may be projected onto a line joining points 280 and 281, and image in a radial slice corresponding to virtual viewpoint 210 may be projected onto a line joining points 282 and 283. The line formed by points 280 and 281 may represent the intersection of the effective field of view of central viewpoint 200 with a line 250 which is parallel to a line joining central viewpoint 200 and virtual viewpoint 210. Similarly, the line formed by points 282 and 283 may represent the intersection of the field of view of virtual viewpoint 210 with a line 250 which is parallel to a line joining central viewpoint 200 and virtual viewpoint 210. A similar re-sampling may be performed when matching a central view with a right virtual view (which may correspond to an image observed from virtual viewpoint 220), or when matching a left virtual view (which may correspond to an image observed from virtual viewpoint 210) with a right virtual view (which may correspond to an image observed from virtual viewpoint 220). As such, a rectified stereo pair of views that sample the lightfield of a scene in the same manner may be obtained. This may make stereo matching easier and more robust.

Figure 15:
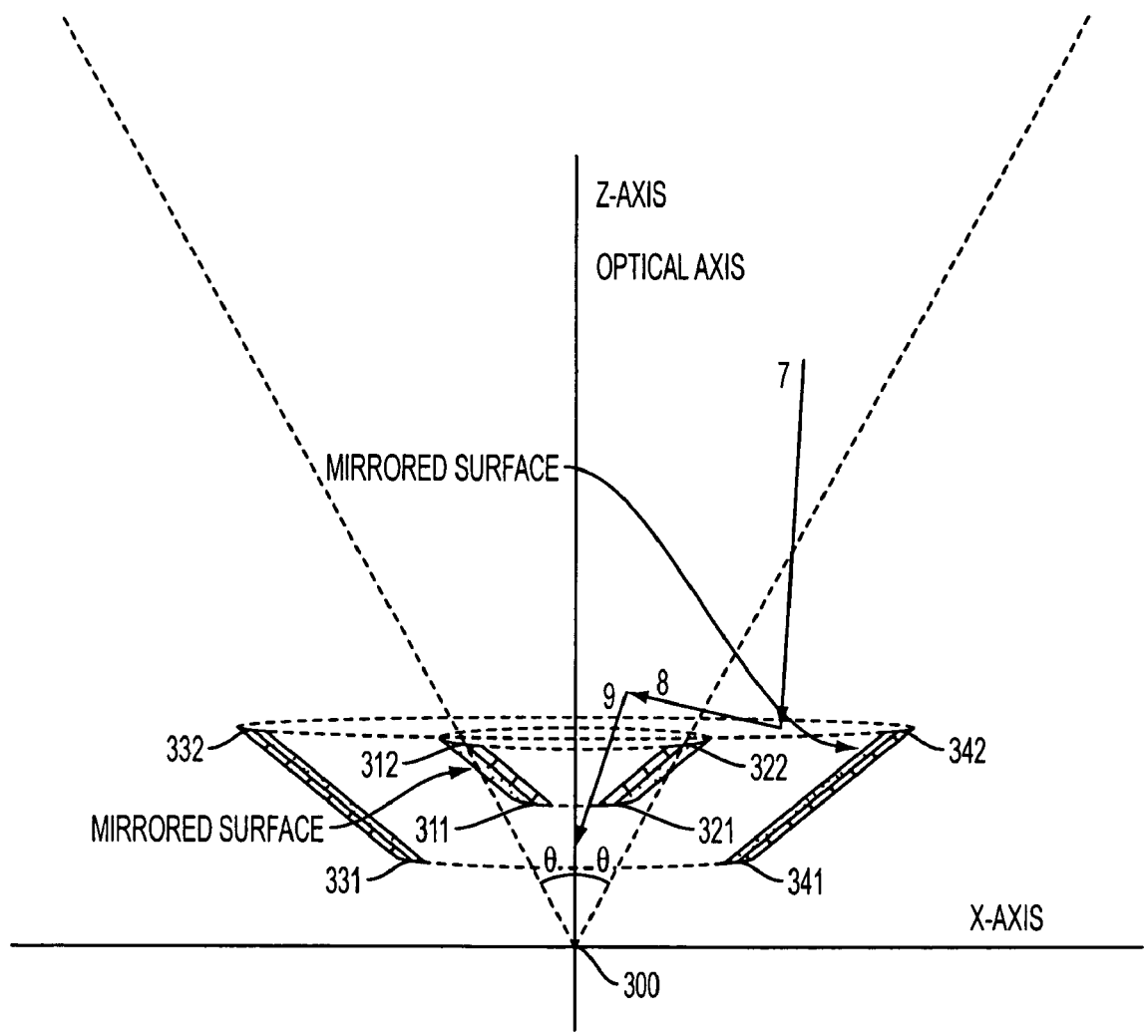
FIG. 15 is a diagram of a catadioptric single camera system having a first truncated cone with a mirrored outside surface and a second truncated cone with a mirrored inside surface in accordance with certain embodiments of the present invention.

Other embodiments in accordance with the present invention are directed to catadioptric single camera systems using a combination of mirrors. Using a combination of mirrors may afford a more compact system as compared to using only one mirror (see for example S. K. Nayar and V. Peri, "Folded catadioptric cameras," *IEEE Conference on Computer Vision and Pattern Recognition,* 1999, which is incorporated by reference herein in its entirety). FIG. 15 shows a diagram of a catadioptric single camera system having a set of two conical mirrors. A first cone may have a mirrored outside surface and be defined by endpoints 311 and 312 and endpoints 321 and 322, and a second cone may have a mirrored inside surface and be defined by endpoints 331 and 332 and endpoints 341 and 342. The first and second cones may be truncated near the apex of the cones and the axes of the first and second cones may be parallel to the z-axis. A camera may be placed so that the entrance pupil is at central viewpoint 300 and the optical axis is pointing along the z-axis.

As shown in FIG. 15, a ray of light 7 may 1) enter the catadioptric single camera system, 2) reflect off the second truncated cone with a mirrored inside surface to form reflected ray of light 8, 3) then reflect off the first truncated cone with a mirrored outside surface to form a reflected ray of light 9, and 4) enter into the camera. As such, the ray of light 7 may be reflected twice in the present embodiment.

Figure 16:
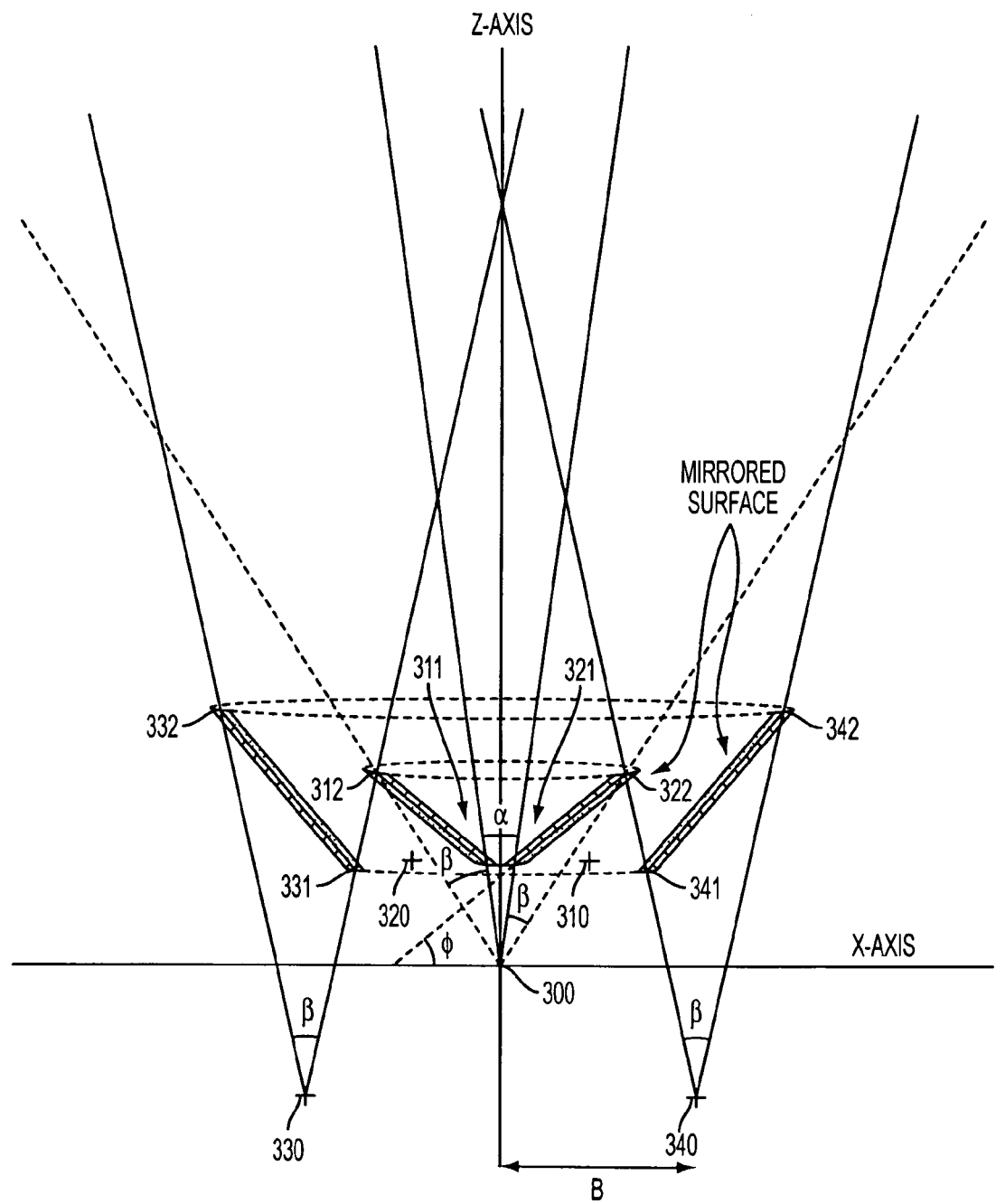
FIG. 16 is a diagram of a catadioptric single camera system having a first truncated cone with a mirrored outside surface and a second truncated cone with a mirrored inside surface in accordance with certain embodiments of the present invention, showing the field of views of the central and virtual viewpoints.

As shown in FIG. 15, the actual field of view of the camera may be represented as an angle spanned by 2θ. As shown in FIG. 16, and similar to the analysis for catadioptric single camera systems having a truncated cone with a mirrored inside surface, the actual field of view of the camera may be partitioned into three regions. The effective field of view of central viewpoint 300 (spanned by an angle α) looks directly at a scene of interest, while each of the side partitions of the actual field of view of the camera (spanned by angles β) is incident on the first mirror.

To determine the location of the virtual viewpoints, central viewpoint 300 may be reflected by the first mirror surface defined by endpoints 311 and 312 and endpoints 321 and 322 to obtain virtual viewpoints 310 and 320, respectively. Virtual viewpoints 310 and 320 can then be reflected in the second mirror surface defined by endpoints 331 and 332 and endpoints 341 and 342 giving virtual viewpoints 330 and 340, respectively. As such, specifying virtual viewpoints 310, 320, 330, and 340 as described above can specify the slopes of the first and second truncated cones, and the effective fields of view of central viewpoint 300 (α) and virtual viewpoints 330 and 340 (β).

Two additional parameters may be specified. The angle that the first mirror makes with the x-axis ($\phi$) can be fixed. Additionally, the distance between central viewpoint 300 and virtual viewpoints 330 or 340 along the x-axis can be fixed to be B.

Figure 17:
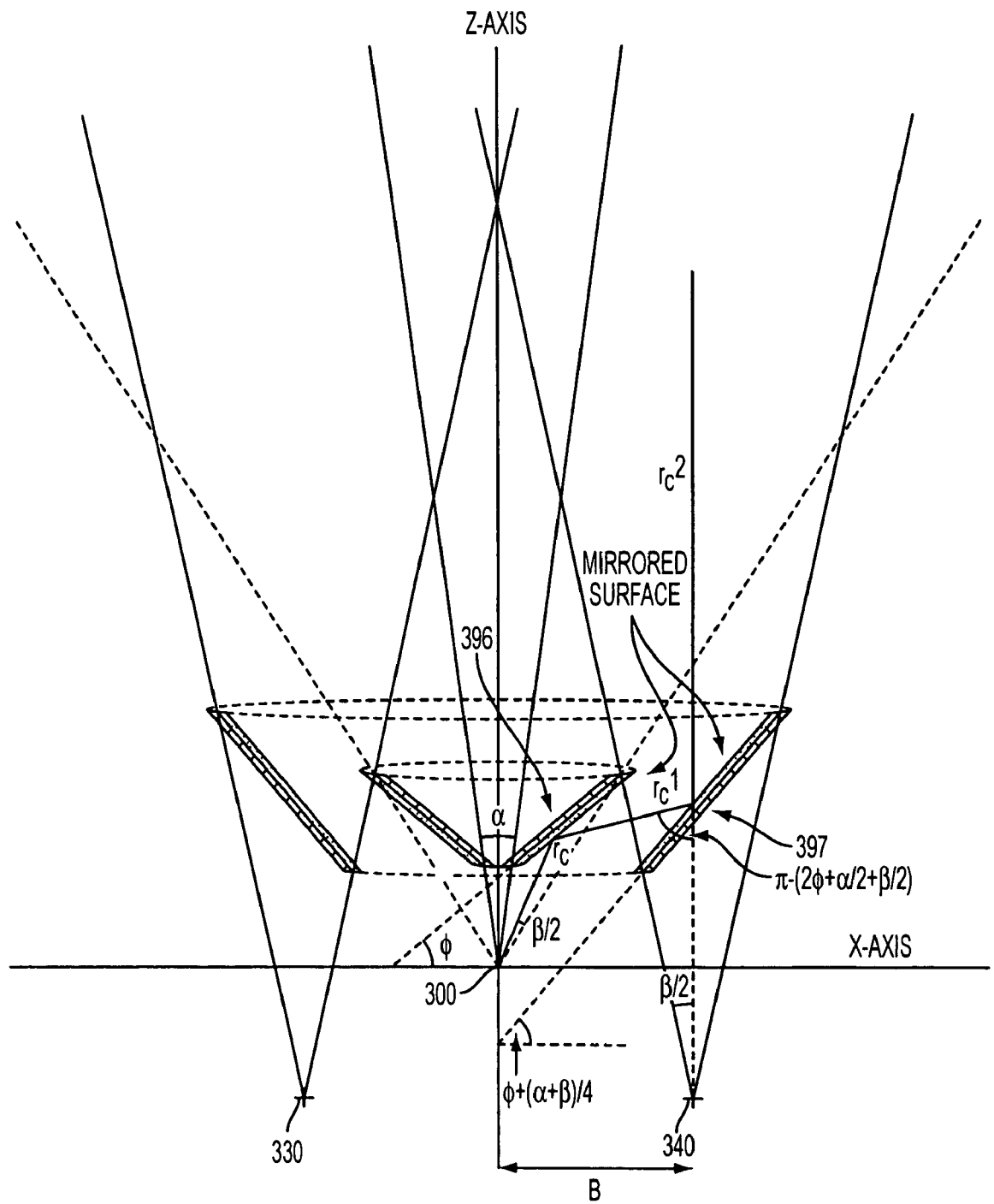
FIG. 17 is a diagram of a catadioptric single camera system having a first truncated cone with a mirrored outside surface and a second truncated cone with a mirrored inside surface in accordance with certain embodiments of the present invention, showing a possible placement of the first and second cones relative to the x-axis.

As shown in FIG. 17, to design the effective fields of view of the system to be forward looking, a central ray $r_c$ of one of the side partitions can be considered. After reflection in the first mirror, a first reflected ray $r_c^1$ is reflected in the second mirror, after which a second reflected ray $r_c^2$ forms the central ray of the field of view of the virtual viewpoint 340, $r_c^2$ can be made parallel to the optical axis. As such, the angle defined by point 396, point 397, and virtual viewpoint 340 can be shown to be equal to $$\pi - \left(2\phi + \frac{\alpha}{2} + \frac{\beta}{2}\right).$$

The second mirror divides the angle formed by point 396, point 397, and virtual viewpoint 340 into two equal parts and makes an angle $$\left(\phi + \frac{\alpha + \beta}{4}\right)$$

with the x-axis.

Figure 18:
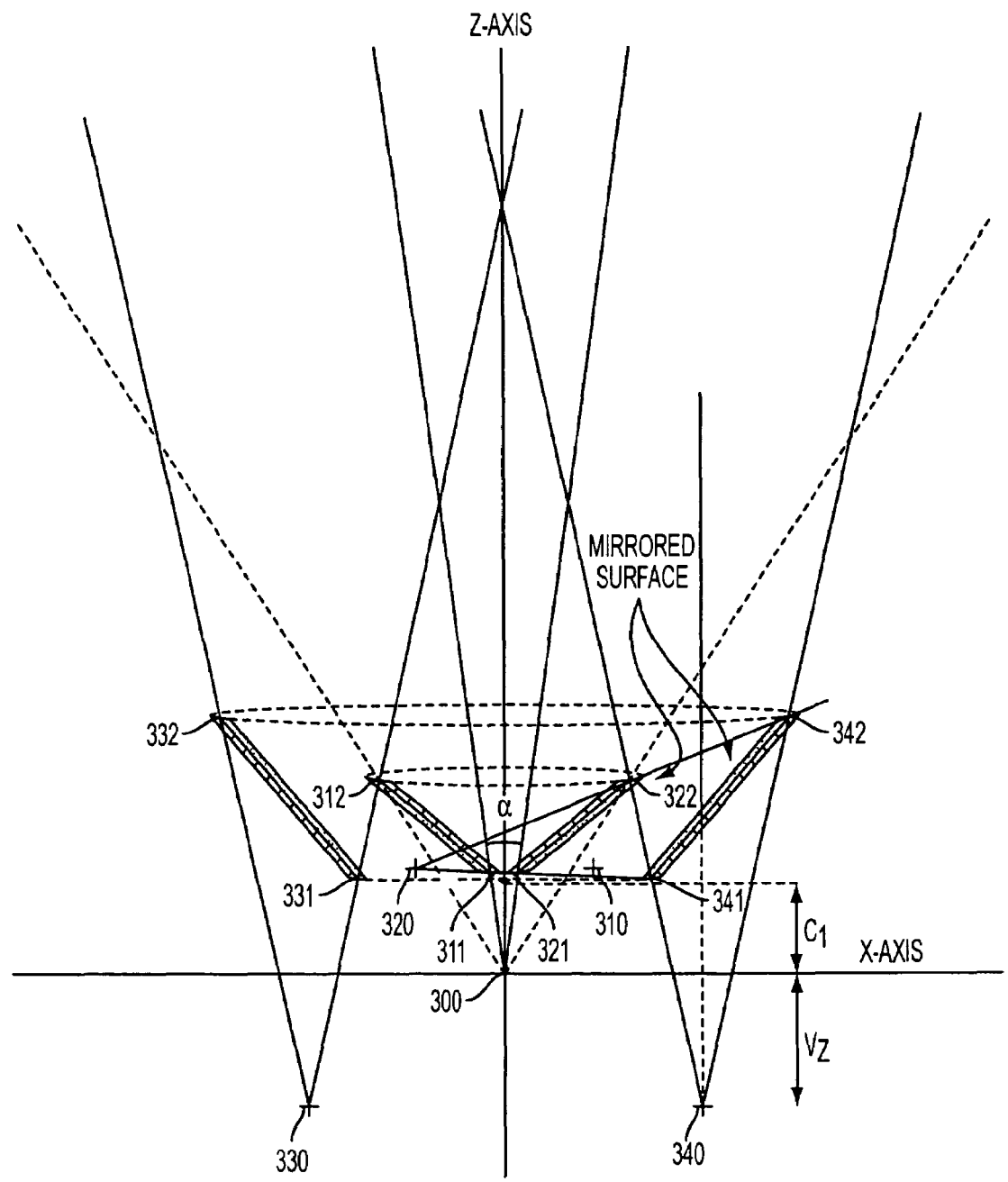
FIG. 18 is a diagram of a catadioptric single camera system having a first truncated cone with a mirrored outside surface and a second truncated cone with a mirrored inside surface in accordance with certain embodiments of the present invention, showing the virtual viewpoints of the system.

FIG. 18 shows that a line formed by endpoints 321 and 322; a line formed by central viewpoint 300 and endpoint 322; and a line formed by virtual viewpoint 340 and endpoint 341 may all intersect at endpoint 322. These, along with the constraint resulting from virtual viewpoint 320 being reflected in the second mirror to give viewpoint 340, may define the z-intercept ($c_1$) of the line representing the sides of the first truncated cone to be $$c_1 = \frac{B(s - m_1)(1 + m_1^2)(1 + m_2 m_3)}{(sm_2 - 2sm_1 - sm_2 m_1^2 - 2m_1 m_2 + 2m_1^2 + m_3 m_2 + m_3 m_2 m_1^2)} \quad [18]$$

The z-coordinate ($v_z$) of virtual viewpoints 330 and 340 can be represented as $$v_z = \frac{m_3 m_1^2 + sm_1^2 - 2m_1 sm_3 - 2m_1 m_3 m_2 + s - m_3 + 2sm_3 m_2}{(sm_2 - 2sm_1 - sm_2 m_1^2 - 2m_1 m_2 + 2m_1^2 + m_3 m_2 + m_3 m_2 m_1^2)} \quad [19]$$

wherein $m_1 = \tan(\phi)$ $$m_2 = \tan\left(\phi + \frac{\alpha}{4} + \frac{\beta}{4}\right), m_3 = \tan\left(\frac{\pi}{2} + \frac{\beta}{2}\right), \text{ and } s = \cot\left(\frac{\alpha}{2} + \beta\right).$$

If $c_1$ is less than zero, the first mirror may not intersect any of the rays that enter the entrance pupil of the camera (located at central viewpoint 300). If $c_1$ is equal to zero, and $\theta < (\pi/2 - \phi)$, no part of the mirror will fall within the field of view of the camera and so no advantage is obtained by having the mirror. If $c_1$ is equal to 0 and $\theta \geq (\pi/2 - \phi)$, only those rays that travel along the sides of the first mirror may be able to interact with the first mirror and enter the camera entrance pupil. Thus, only two rays per radial slice may enter the entrance pupil of the camera after making contact with the first mirror. Therefore, for practical systems, $c_1$ may be greater than 0.

By fixing the distance between central viewpoint 300 and virtual viewpoint 330 and the distance between central viewpoint 300 and virtual viewpoint 340 along the x-axis to be B, the coordinates of virtual viewpoints 330 and 340 can be represented by $[-B, v_z]$ and $[B, v_z]$, respectively. The coordinates of virtual viewpoints 310 and 320 can be obtained by reflecting 300 in the first mirror and can be represented by $[c_1 \sin(2\phi), 2c_1 \cos^2(\phi)]$ and $[-c_1 \sin(2\phi), 2c_1 \cos^2(\phi)]$, respectively. The first mirror can be placed so that the effective field of view of central viewpoint 300 just grazes endpoints 311 and 321 of the truncated cone. As such, the radius of the first truncated cone at endpoints 311 and 312 can be represented as $$R_n^1 = \frac{c_1 \sin\left(\frac{\alpha}{2}\right) \cos(\phi)}{\cos\left(\frac{\alpha}{2} + \phi\right)} \quad [20]$$

and the perpendicular distance of endpoints 311 and 312 from x-axis can be represented as $$D_n^1 = \frac{c_1 \cos\left(\frac{\alpha}{2}\right) \cos(\phi)}{\cos\left(\frac{\alpha}{2} + \phi\right)} \quad [21]$$

Similarly, endpoints 312 and 322 of the first truncated cone can be placed so that the ends of the actual field of view of the camera just graze the first truncated cone. This gives the radius of the first truncated cone near endpoints 312 and 322 as $$R_f^1 = \frac{c_1 \sin\left(\frac{\alpha}{2} + \beta\right) \cos(\phi)}{\cos\left(\frac{\alpha}{2} + \beta + \phi\right)} \quad [22]$$

and the distance of endpoints 312 and 322 from the x-axis as $$D_f^1 = \frac{c_1 \cos\left(\frac{\alpha}{2} + \beta\right) \cos(\phi)}{\cos\left(\frac{\alpha}{2} + \beta + \phi\right)} \quad [23]$$

The height of the first mirror can be obtained by subtracting equation [21] from equation [23], as shown below:

$$H = D_f^1 - D_n^1 \quad (24)$$

The location of the second truncated cone may be analyzed as follows. The virtual viewpoints 310 and 320 have a field of view having an angle spanned by $\beta$, whose outermost rays graze endpoints 311 and 312 and endpoints 321 and 322, respectively. As previously described, virtual viewpoint 340 may have a forward looking field of view of $\beta$, so that the outermost rays of its effective field of view make an angle $\beta/2$ with the z-axis. Intersecting these rays with a line formed by virtual viewpoint 320 and endpoint 321 and a line formed by virtual viewpoint 320 with endpoint 322 can give the endpoints 341 and 342 of the second truncated cone, respectively. The x-coordinate of endpoint 341 can give the near radius of the second mirror, while the z-coordinate can give the perpendicular distance of endpoint 341 of the second truncated cone from the x-axis. Similarly, the x-coordinate of endpoint 342 can give the radius of the second truncated cone near endpoint 342, while the perpendicular distance of endpoint 342 of the second truncated cone from the x-axis can be given by the z-coordinate of endpoint 342. As such, $R_n^2$, $R_f^2$, $D_n^2$ and $D_f^2$ can also be specified.

Figure 19:
FIG. 19 is a simulated image that results when looking at a convex surface through a catadioptric single camera system having a first truncated cone with a mirrored outside surface and a second truncated cone with a mirrored inside surface in accordance with certain embodiments of the present invention.

FIG. 19 shows an image 60 that may result when looking at a convex surface with a catadioptric single camera system having a first truncated cone with a mirrored outside surface and a second truncated cone with a mirrored inside surface in accordance with certain embodiments of the present invention. Multiple projections of the same feature can be seen to appear along each radial line.

Radial epipolar geometry, foveated vision characteristics, resolution of the camera, and a locus of circular viewpoints whose effective fields of view are forward looking are similar to other embodiments of the present invention. However, a more compact, flexible design can be realized with a catadioptric single camera system having a first truncated cone with a mirrored outside surface and a second truncated cone with a mirrored inside surface.

In addition, as previously discussed, $c_1$ may be greater than 0. Furthermore, for practical systems, $R_n^1$, $R_f^1$, $D_n^1$, and $D_f^1$ are also greater than 0, which implies that $$\cos\left(\frac{\alpha}{2} + \beta + \phi\right) > 0 \Rightarrow \left(\frac{\alpha}{2} + \beta + \phi\right) < \frac{\pi}{2}.$$

As such, the situation where β is greater than α need not be precluded, and the field of view of central viewpoint 300 in each radial slice (α) can be smaller than the field of view of each virtual viewpoint 330 and 340 (β).

Furthermore, as long as parameters α, β, φ, and B are chosen, such that the parameters of the first truncated cone are physically realizable, i.e. $R_n^1$, $R_f^1$, $D_n^1$, and $D_f^1$ are positive numbers, the fields of view of virtual viewpoints 330 and 310 may always intersect, and the fields of view of virtual viewpoints 340 and 320 may always intersect to define the second truncated cone. Hence, if the first truncated cone is physically realizable, the second truncated cone may also be physically realizable.

Figure 20:
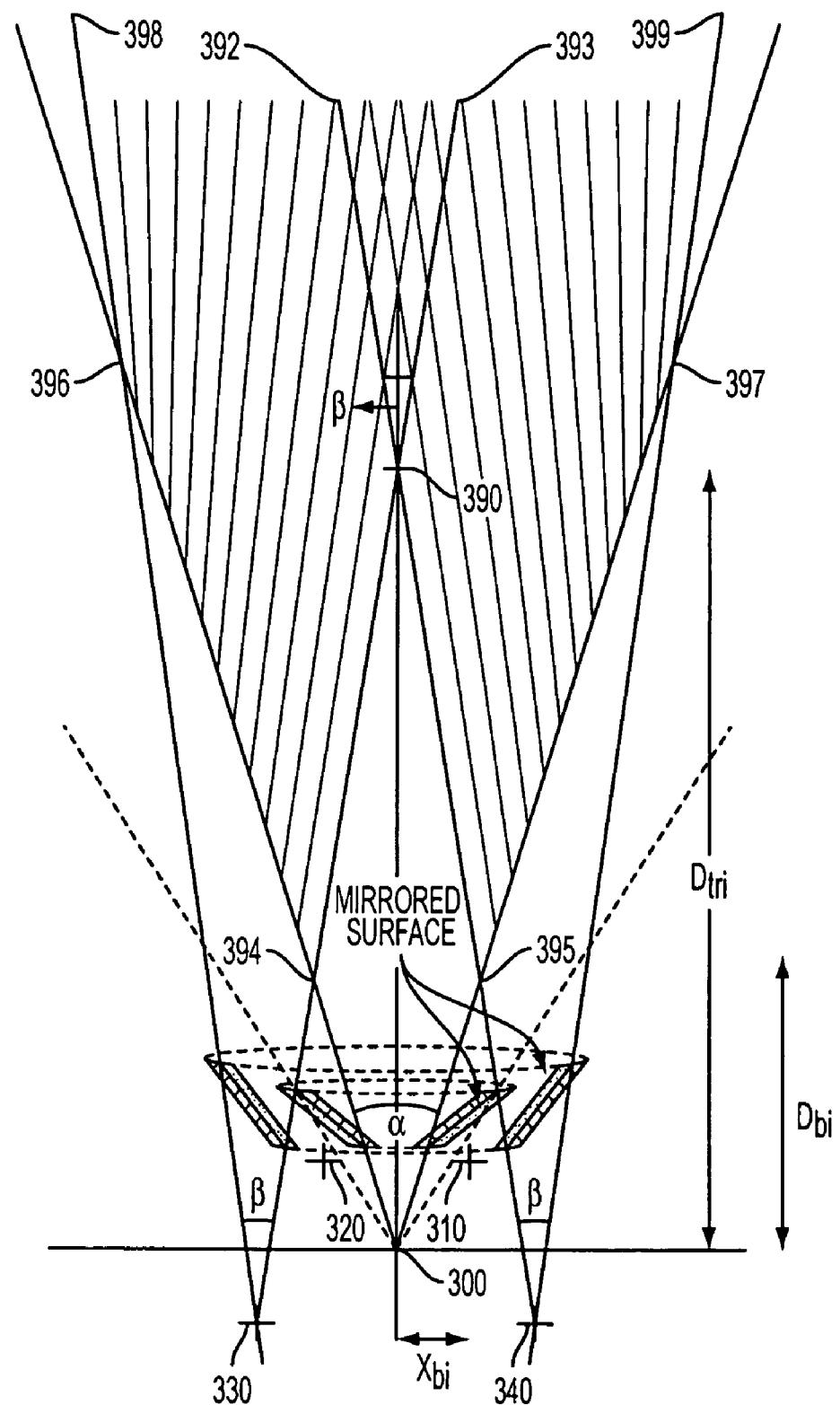
FIG. 20 is a diagram of a catadioptric single camera system having a first truncated cone with a mirrored outside surface and a second truncated cone with a mirrored inside surface in accordance with certain embodiments of the present invention, showing the resulting trinocular and binocular stereo spaces.

If the design is set so that α is greater than β, then the stereo spaces can be analyzed in the same manner as that presented earlier, as illustrated in FIG. 20. The trinocular stereo space can be shown to be an infinite cone defined by points 392, 396, and 393 having a field of view of β with its apex at point 390, wherein the distance between point 390 and central viewpoint 300 can be shown to be $$D_{tri} = c_1 \frac{B\cos\left(\frac{\alpha}{2} + \beta\right)\cos(\phi) - v_z\sin\left(\frac{\alpha}{2} + \beta\right)\cos(\phi)}{B\cos\left(\frac{\alpha}{2} + \beta + \phi\right) - c_1\sin\left(\frac{\alpha}{2} + \beta\right)\cos(\phi)} \quad [25]$$

The binocular stereo space can be shown to be an infinite space defined by point 398, point 396, point 394, point 390, point 395, point 397, and point 399, wherein the coordinates of points 394 and 395 can be shown to be [$-x_{bi}$, $D_{bi}$] and [$x_{bi}$, $D_{bi}$], respectively. $D_{bi}$ and $x_{bi}$ can be shown to be:

$$D_{bi} = \frac{B + v_z\tan(\beta/2)}{\tan(\alpha/2) + \tan(\beta/2)} \quad [26]$$

$$x_{bi} = D_{bi} * \tan(\alpha/2) \quad [27]$$

Similar analysis can be performed for the case where β is greater than α.

As such, the trinocular space can be considered a proper subset of the binocular space. However, the strictly binocular space may comprise overlaps of the field of views of all possible pairwise combinations of effective viewpoints in each radial slice, which is a consequence of the fact that the effective fields of view of virtual viewpoints 330 and 340 in a radial slice can be greater than the effective field of view of central viewpoint 300.

The processing of the captured images can be performed in nearly the same manner as that performed for catadioptric single camera systems having a truncated cone with a mirrored inside surface. However, since the light that is part of the left and right virtual views may be reflected twice, flipping of the left and right virtual views need not be performed, as the second reflection cancels the effect of the first reflection.

Figure 21:
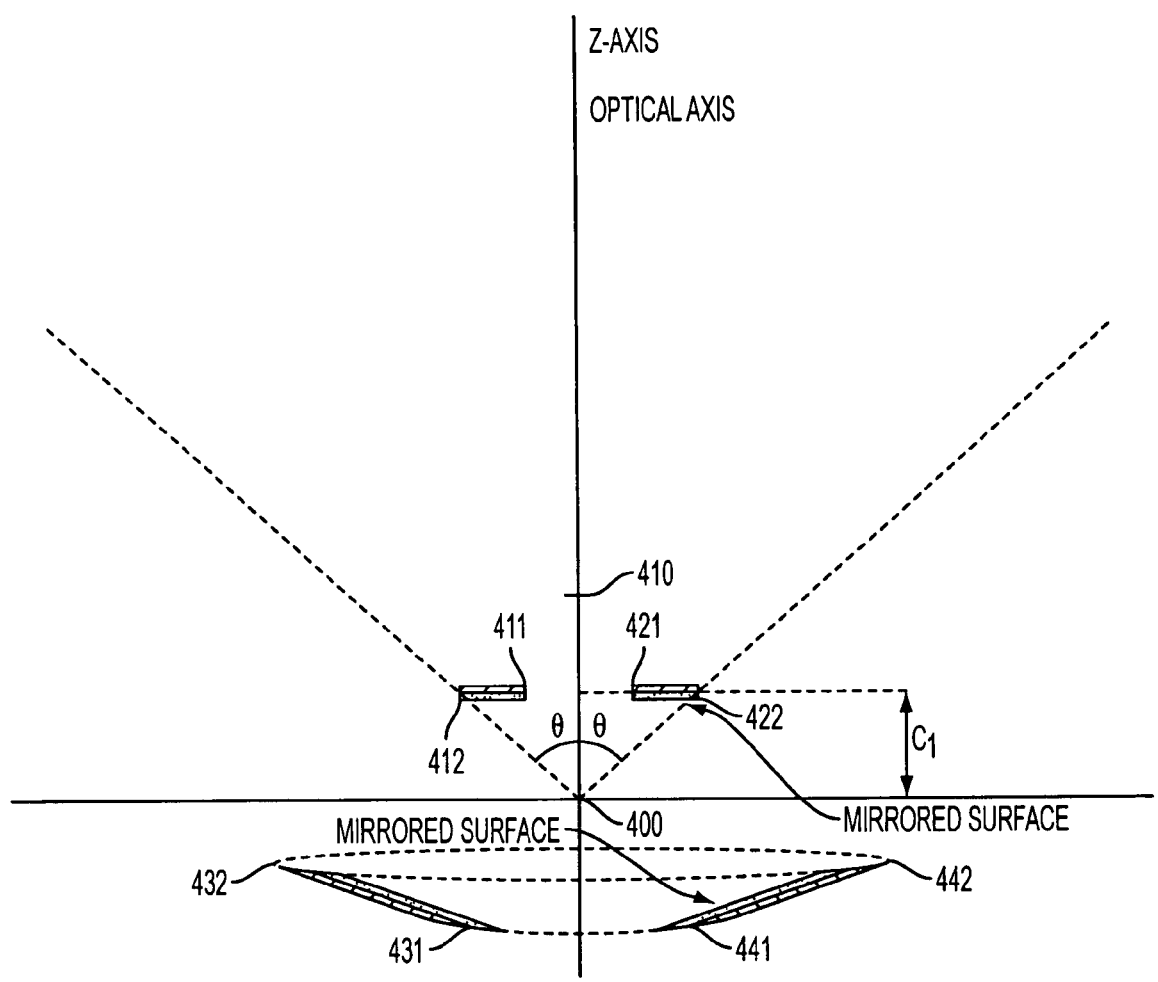
FIG. 21 is a diagram of a catadioptric single camera system having a planar mirror and a truncated cone with a mirrored inside surface in accordance with certain embodiments of the present invention.

Other embodiments of the invention are directed to a catadioptric single camera system having a planar mirror and a truncated cone with a mirrored inside surface. As shown in FIG. 21, the planar mirror is defined by endpoints 411 and 412 and endpoints 421 and 422 and the truncated cone with a mirrored inside surface is defined by endpoints 431 and 432 and endpoints 441 and 442. The entrance pupil of the camera is located at central viewpoint 400.

In this case, the virtual viewpoints arising from the reflection of central viewpoint 400 with the first planar mirror may both be located at [0,2$c_1$], and thus there is only a single virtual viewpoint 410, wherein the value of $c_1$ can be represented as $$c_1 = \frac{B\cos\left(\frac{\alpha}{2} + \beta\right)\sin\left(\frac{\alpha}{4} - \frac{\beta}{4}\right)}{\sin\left(\frac{\alpha}{4} + \frac{\beta}{4}\right)\sin\left(\frac{\alpha}{2} + \frac{\beta}{2}\right)} \quad [28]$$

wherein α, β, and B are as described above in connection with the discussion of the example of a catadioptric single camera system having a first truncated cone with a mirrored outside surface and a second truncated cone mirrored on the inside.

The reflection of virtual viewpoint 410 with a second mirror having sides defined by endpoints 431 and 432 and endpoints 441 and 442 lead to virtual viewpoints 430 and 440, respectively.

If α is less than β, then $c_1$ becomes negative. This may correspond to a situation where the planar mirror is placed behind the entrance pupil of the camera (located at central viewpoint 400). If this is the case, the planar mirror may not come into play, yielding no benefits for utilizing the planar mirror. If α is equal to β, then $c_1$ is equal to zero, which also may not yield any benefits for utilizing the planar mirror. Therefore, the effective field of view of central viewpoint 400 in each radial slice may have to be greater than that of the virtual viewpoints of that slice, i.e. α is greater than β.

Figure 22:
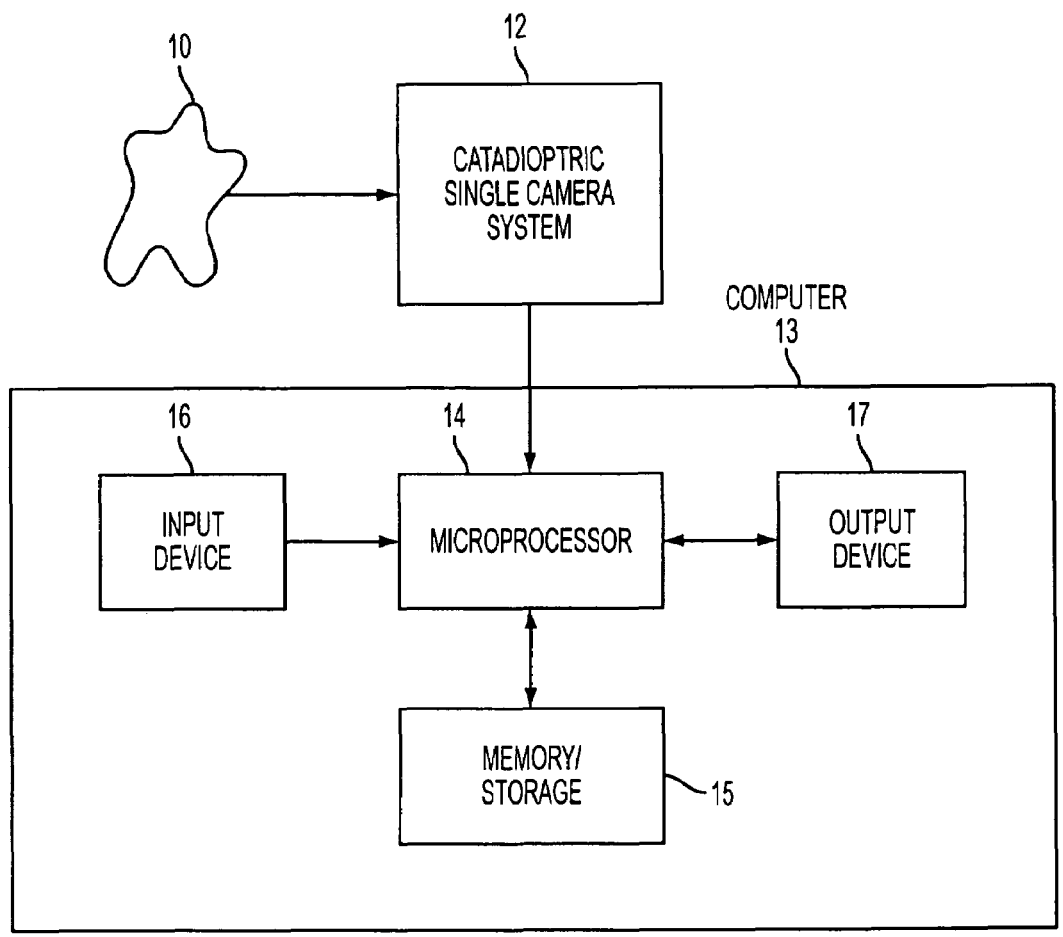
FIG. 22 is a diagram of a system capable of sampling the lightfield of a scene with a catadioptric single camera system and processing a captured image to obtain depth information in accordance with certain embodiments of the present invention.

An example of a system in accordance with certain embodiments of the present invention that is capable of obtaining a captured image, and obtaining depth information from such an image, is illustrated in FIG. 22. As shown, a lightfield of a scene of interest 10 is sampled using a catadioptric single camera system 12. The image obtained can be viewed directly on the camera system 12 or may be displayed through an output device 17. The captured image is then transformed into polar coordinates and processed to obtain depth information using a computer 13, which includes a microprocessor 14, memory 15, input device 16, and an output device 17.

The catadioptric single camera system 12 may be any one of the embodiments explicitly described or any variants thereof. For example, a camera may be placed near a catadioptric system having a cylinder with a mirrored inside surface so that the entrance pupil of the camera is at the central viewpoint of the catadioptric system. Alternatively, a camera may be placed near a catadioptric system having a truncated cone with a mirrored inside surface so that the entrance pupil of the camera is at the central viewpoint of the catadioptric system. In another embodiment, a camera may be placed near a catadioptric system having a first truncated cone with a mirrored outside surface and a second truncated cone with a mirrored inside surface so that the entrance pupil of the camera is at the central viewpoint of the catadioptric system. In yet another embodiment, a camera may be placed near a catadioptric system having a planar mirror and a truncated cone with a mirrored inside surface so that the entrance pupil of the camera is at the central viewpoint of the catadioptric system.

Figure 23:
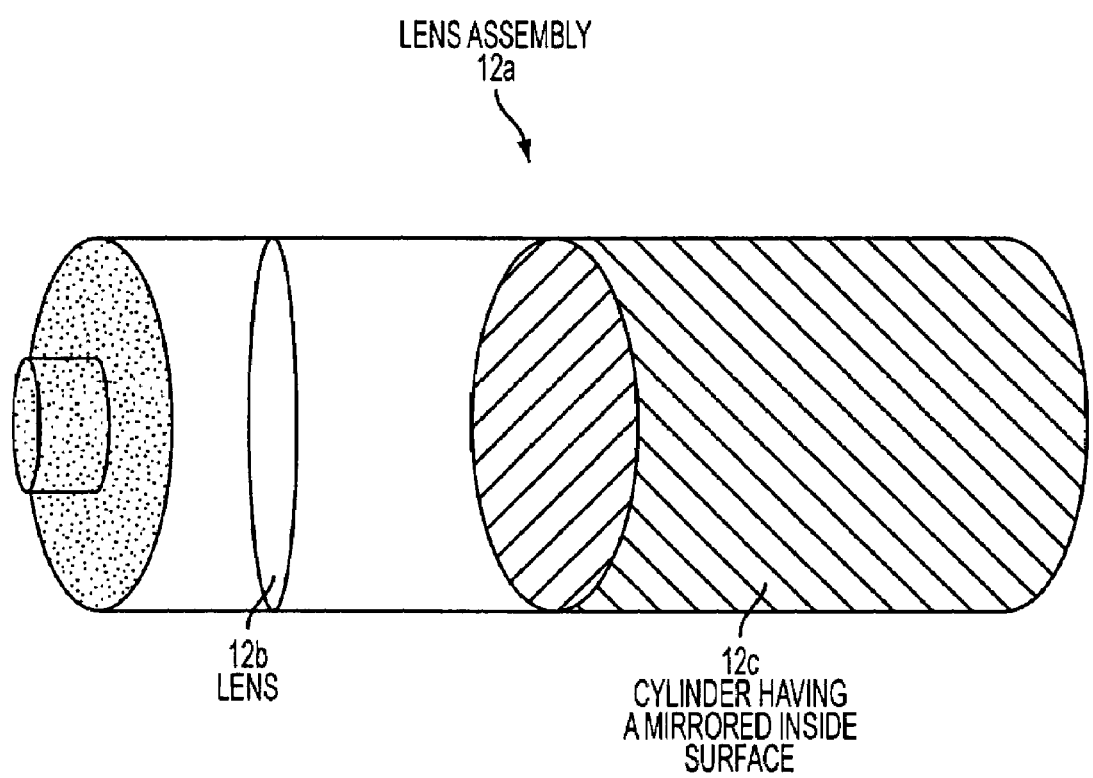
FIG. 23 is a diagram of a catadioptric optics system housed in a lens assembly in accordance with certain embodiments of the present invention.

FIG. 23 shows one example of a catadioptric system, which is housed in a lens assembly. Lens assembly 12a contains a lens 12b and a cylinder having a mirrored inside surface 12c. The cylinder having a mirrored inside surface may be an independent, detachable element or may be formed directly on the lens assembly itself. The lens assembly may contain additional lens and/or mirror elements not specifically shown in FIG. 23. Lens assembly 12a may be attached onto a camera to form a catadioptric single camera system. Examples of a camera include a film-based camera, a digital camera, a video camera using a magnetic recording medium, a video camera using a digital recording medium, and variants thereof. It should be understood that the cameras specifically exemplified are not meant to be an exhaustive list, and thus should not be construed as being limiting. In addition, other embodiments of the invention, such as replacing the cylinder having a mirrored inside surface with a cone having a mirrored inside surface in the lens assembly, will be readily apparent to one of ordinary skill in the art.

Figure 24:
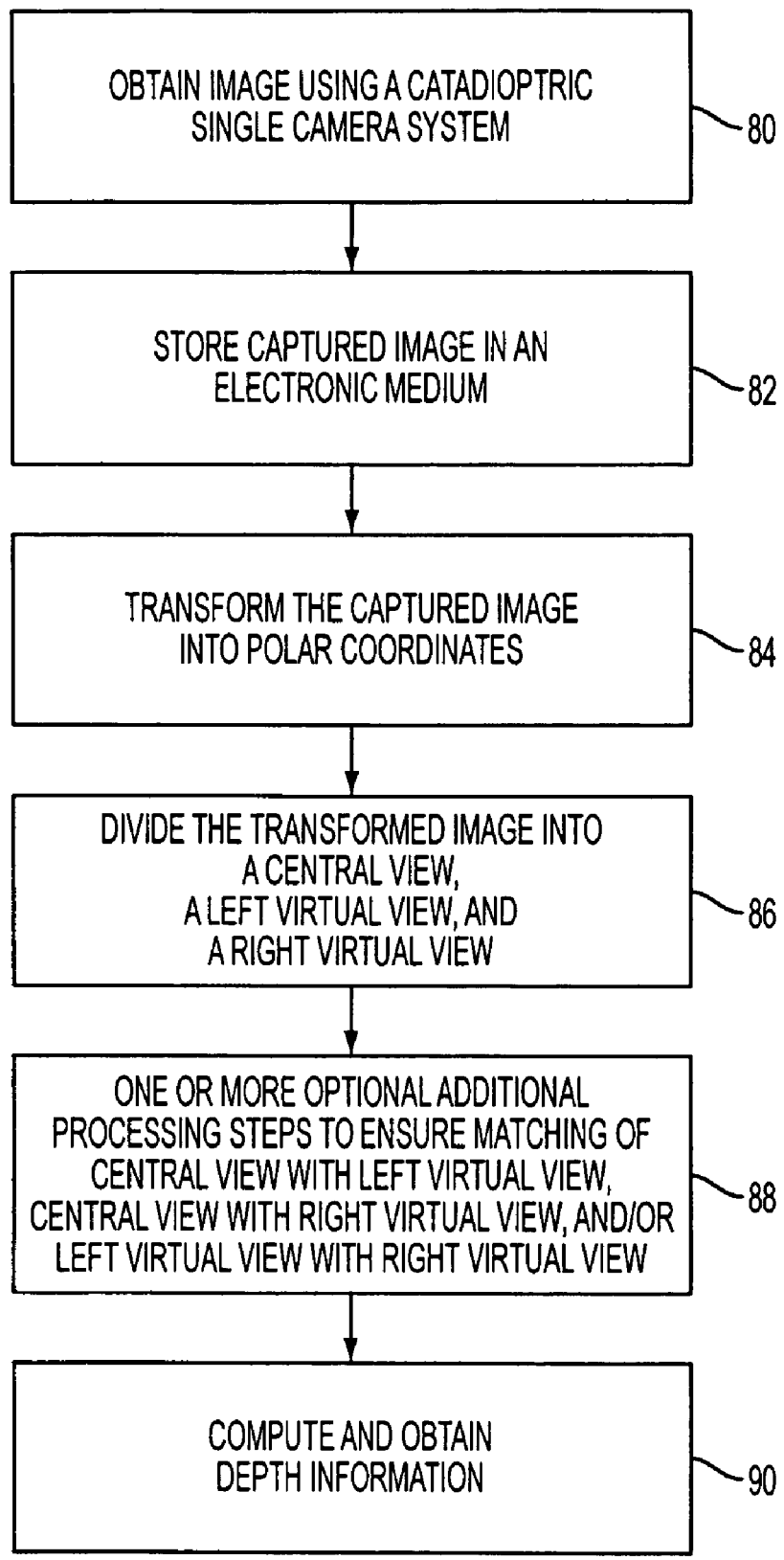
FIG. 24 is a flowchart describing how to obtain depth information from an image captured by a catadioptric single camera system in accordance with certain embodiments of the present invention.

A method of obtaining depth information from an image captured by a catadioptric single camera system in accordance with certain embodiments of the present invention is described in FIG. 24. Step 80 shows sampling the lightfield of a scene of interest with a catadioptric single camera system to obtain an image. Step 82 shows that the captured image may be stored in an electronic medium to be read by a computer. This may comprise digitizing a physical medium containing the image or obtaining a digitized image directly from a digital camera. Step 84 illustrates that a computer may then transform the captured image into polar coordinates. The transformed image may then be divided into a central view, a left virtual view, and a right virtual view, as shown in step 86. Step 88 shows that one or more additional processing steps may optionally be performed to ensure matching between a central view and a virtual view. The subdivided images may then be processed using conventional stereo algorithms to compute and collect depth information, as shown in step 90.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A catadioptric single camera system comprising:
   a camera; and
   one or more mirrors, each which form at least a part of an inside surface of a cylinder or a truncated cone,
   wherein the camera and the one or more mirrors have a radial epipolar geometry.

2. The system as claimed in claim 1, wherein the one or more mirrors include at least a part of an inside surface of a first truncated cone and at least a part of an outside surface of a second truncated cone.

3. The system as claimed in claim 2, wherein the camera has an entrance pupil and an optical axis, the first truncated cone has a first axis that is parallel to the optical axis of the camera, the radius of the first truncated cone increases with increasing distance from the entrance pupil of the camera, the second truncated cone has a second axis that is parallel to the optical axis of the camera, and the radius of the second truncated cone increases with increasing distance from the entrance pupil of the camera.

4. The system as claimed in claim 1, wherein the one or more mirrors include at least a part of a planar surface and at least a part of an inside surface of the truncated cone.

5. The system as claimed in claim 4, wherein the camera has an entrance pupil and an optical axis, the truncated cone has an axis that is parallel to the optical axis of the camera, and the radius of the truncated cone decreases with increasing distance from the entrance pupil of the camera, and the entrance pupil of the camera is located between the planar surface and the truncated cone.

6. The system as claimed in claim 4, wherein the camera has an entrance pupil and an optical axis, the truncated cone has an axis that is parallel to the optical axis of the camera, and the radius of the truncated cone increases with increasing distance from the entrance pupil of the camera, and the truncated cone is located between the planar surface and the entrance pupil of the camera.

7. The catadioptric single camera system as claimed in claim 1, wherein the camera and the one or more mirrors have a foveated vision characteristic.

8. The system as claimed in claim 1, wherein the one or more mirrors form at least a part of an inside surface of the cylinder.

9. The system as claimed in claim 8, wherein the camera has an optical axis, and the cylinder has an axis that is parallel to the optical axis of the camera.

10. The system as claimed in claim 1, wherein the one or more mirrors form at least a part of an inside surface of the truncated cone.

11. The system as claimed in claim 10, wherein the camera has an entrance pupil and an optical axis, the truncated cone has an axis that is parallel to the optical axis of the camera, and the radius of the truncated cone increases with increasing distance from the entrance pupil of the camera.

12. A lens assembly comprising:
    one or more lenses; and
    one or more mirrors that form at least a part of an inside surface of a truncated cone,
    wherein the one or more lenses and the one or more mirrors have a radial epipolar geometry.

13. The lens assembly as claimed in claim 12, wherein the one or more lenses have an entrance pupil and an optical axis, the truncated cone has an axis that is parallel to the optical axis of the lens, and the radius of the truncated cone increases with increasing distance from the entrance pupil of the lens.

14. A lens assembly comprising:
one or more lenses; and
one or more mirrors that form at least a part of an inside surface of a first truncated cone and at least a part of an outside surface of a second truncated cone,
wherein the one or more lenses and the one or more mirrors have a radial epipolar geometry.

15. The lens assembly as claimed in claim 14, wherein the one or more lenses have an entrance pupil and an optical axis, the first truncated cone has a first axis that is parallel to the optical axis of the one or more lenses, the radius of the first truncated cone increases with increasing distance from the entrance pupil of the one or more lenses, the second truncated cone has a second axis that is parallel to the optical axis of the one or more lenses, and the radius of the second truncated cone increases with increasing distance from the entrance pupil of the one or more lenses.

16. A lens assembly comprising:
one or more lenses; and
one or more mirrors that form at least a part of a planar surface and at least a part of an inside surface of a truncated cone,
wherein the one or more lenses and the one or more mirrors have a radial epipolar geometry.

17. The lens assembly as claimed in claim 16, wherein the one or more lenses have an entrance pupil and an optical axis, the truncated cone has an axis that is parallel to the optical axis of the one or more lenses, the radius of the truncated cone decreases with increasing distance from the entrance pupil of the one or more lenses, and the entrance pupil of the one or more lenses is located between the planar surface and the truncated cone.

18. The lens assembly as claimed in claim 16, wherein the one or more lens have an entrance pupil and an optical axis, the truncated cone has an axis that is parallel to the optical axis of the one or more lenses, and the radius of the truncated cone increases with increasing distance from the entrance pupil of the one or more lenses, and the truncated cone is located between the planar surface and the entrance pupil of the one or more lenses.

19. A method obtaining depth information from an image, said method comprising:
sampling a lightfield of a scene with a camera and one or more mirrors that form at least a part of an inside surface of a cylinder or a truncated cone to obtain the image; and
processing the image to obtain depth information;
wherein the camera and the one or more mirrors have a radial epipolar geometry.

20. The method as claimed in claim 19, wherein the processing comprises:
displaying the image in polar coordinates to obtain a transformed image; and dividing the transformed image into sub-images.

21. The method as claimed in claim 20, wherein the processing further comprises: performing one or more stereo matching algorithms on the sub-images to obtain measurements of corresponding points that can be used to compute depth; and computing depth information.

22. A computer readable medium comprising instructions being executed by a computer, the instructions including a software application for obtaining depth information from an image, the instructions for implementing the steps of:
sampling a lightfield of a scene with a camera and one or more mirrors that form at least a part of an inside surface of a cylinder or a truncated cone to obtain the image; and
processing the image to obtain depth information;
wherein the camera and the one or more mirrors have a radial epipolar geometry.

23. The medium according to claim 22, wherein the processing comprises:
displaying the image in polar coordinates to obtain a transformed image; and dividing the transformed image into sub-images.

24. The medium according to claim 23, wherein the processing further comprises: performing one or more stereo matching algorithms on the sub-images to obtain measurements of corresponding points that can be used to compute depth; and computing depth information.

25. A lens assembly comprising:
one or more lenses; and
one or more mirrors that form at least a part of an inside surface of a cylinder,
wherein the one or more lenses and the one or more mirrors have a radial epipolar geometry.

26. The lens assembly as claimed in claim 25, wherein the one or more lenses have an optical axis, and the cylinder has an axis that is parallel to the optical axis of the one or more lenses.

* * * * *